United States Patent
Endo et al.

(10) Patent No.: US 8,145,259 B2
(45) Date of Patent: Mar. 27, 2012

(54) MOBILE TERMINAL DEVICE

(75) Inventors: Isao Endo, Kanagawa (JP); Kazuhiro Kato, Tokyo (JP)

(73) Assignee: Sony Ericsson Mobile Communications AB, Lund (SE)

( * ) Notice: Subject to any disclaimer, the term of this patent is extended or adjusted under 35 U.S.C. 154(b) by 238 days.

(21) Appl. No.: 12/662,061

(22) Filed: Mar. 30, 2010

(65) Prior Publication Data

US 2010/0265688 A1    Oct. 21, 2010

(30) Foreign Application Priority Data

Apr. 17, 2009  (JP) ................................ 2009-100955
Jan. 13, 2010   (JP) ................................ 2010-005342

(51) Int. Cl.
    *H04M 1/00* (2006.01)
(52) U.S. Cl. ............... 455/550.1; 455/575.1; 455/575.4; 455/575.8
(58) Field of Classification Search .............. 455/550.1, 455/575.1, 575.8, 575.4
    See application file for complete search history.

(56) References Cited

U.S. PATENT DOCUMENTS

2009/0093285 A1    4/2009  Weng et al.
2010/0151924 A1*   6/2010  Amano ...................... 455/575.4

FOREIGN PATENT DOCUMENTS

| EP | 1 988 691 A2 | 11/2008 |
|---|---|---|
| JP | 2005-167847 | 6/2005 |
| KR | 2007-0071462 A | 7/2007 |
| WO | WO-2009/017381 A2 | 2/2009 |

OTHER PUBLICATIONS

European Search Report issued Jul. 12, 2010 for corresponding European Application No. 10 15 7818.

* cited by examiner

*Primary Examiner* — Nghi Ly
(74) *Attorney, Agent, or Firm* — Rader, Fishman & Grauer PLLC

(57) ABSTRACT

A mobile terminal device includes a first case including a display section, a second case including a keyboard, and a slide holding mechanism which, when the first case slides with respect to the second case in the opening direction from a closed state wherein the first case is substantially fully superimposed on the second case, partially exposes the keyboard and brings the cases into an open state wherein the first case inclines with respect to the second case. The mechanism includes a slide pin including guide shaft insertion holes, a guide shaft inserted in the holes, a biasing member having one end connected to the slide pin and the other end connected to the second case, an arm member having one end connected to the slide pin and the other end connected to the first case, and a guide plate provided to the second case and including a guide hole.

12 Claims, 18 Drawing Sheets

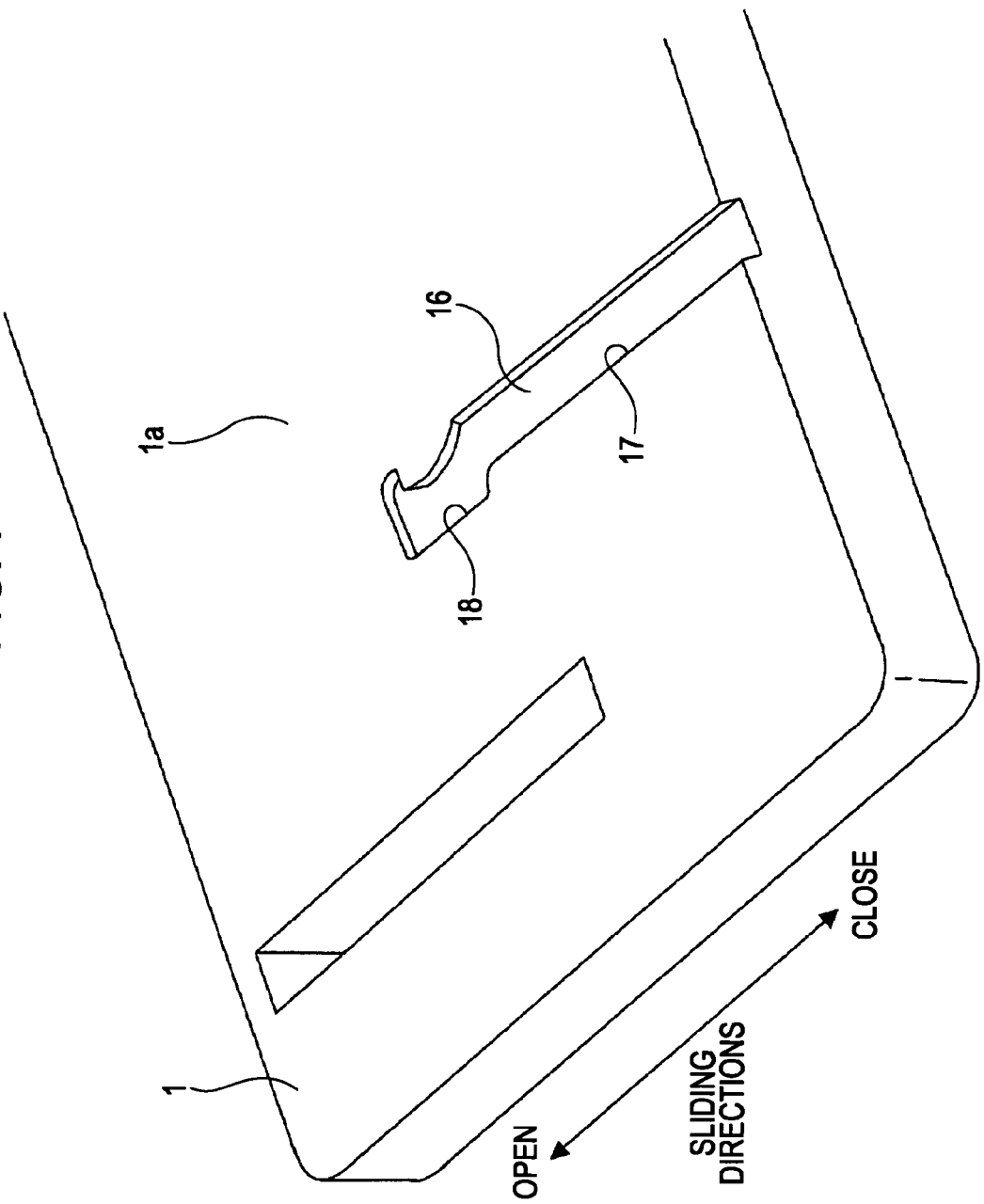

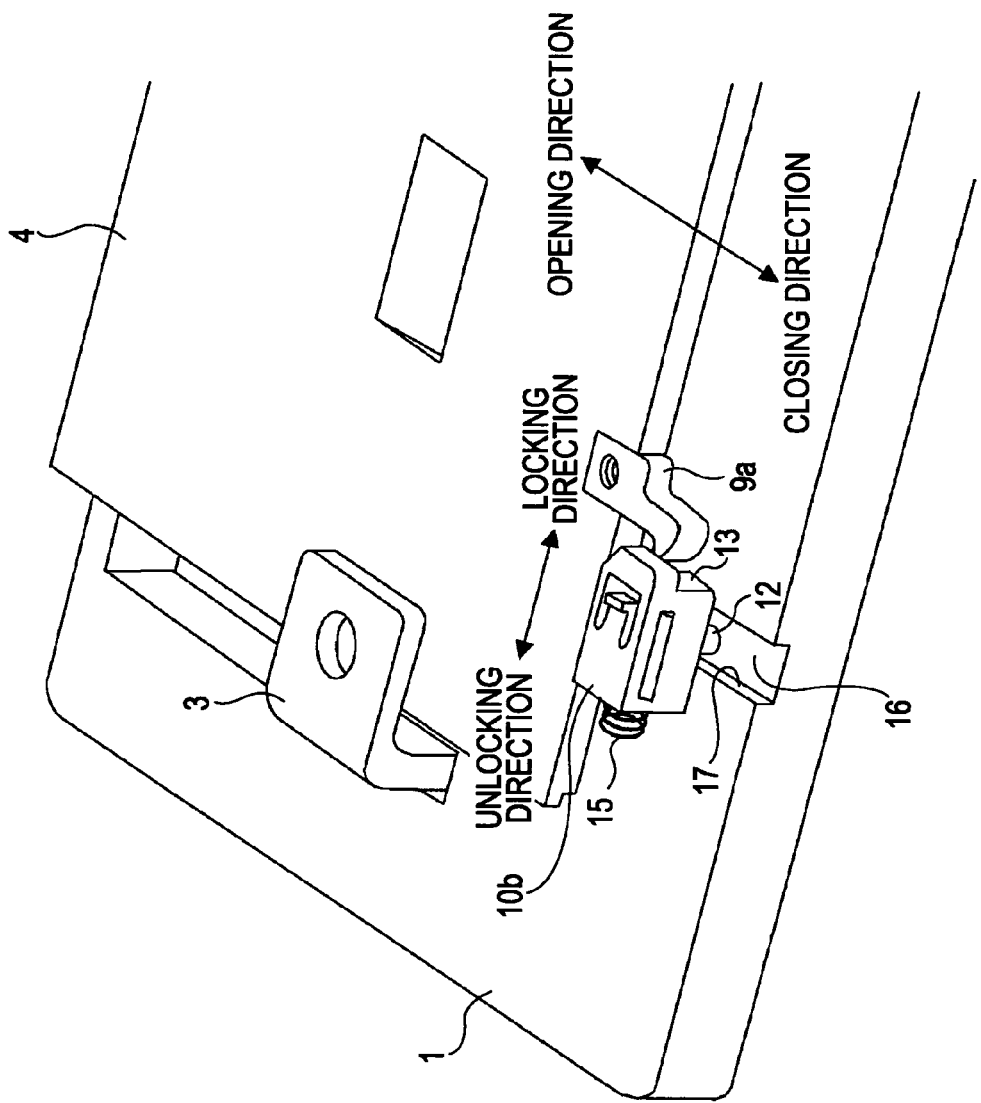

MOBILE TERMINAL DEVICE

BACKGROUND OF THE INVENTION

1. Field of the Invention

The present invention relates to a mobile terminal device which slides first and second cases into an open or closed state, and which is suitably applied to a mobile device, such as a mobile phone, a PHS (Personal Handyphone System) phone, a PDA (Personal Digital Assistant) device, a portable game machine, and a digital camera device, for example.

The present invention particularly relates to a mobile terminal device which slides first and second cases into an open state such that one of the cases provided with a display section is obliquely inclined to improve the visibility of the display section.

2. Description of the Related Art

Japanese Unexamined Laid-Open Patent Application Publication No. 2005-167847 (Patent Document 1) discloses a mobile communication terminal designed for easier sliding operation. In this mobile communication terminal, a display case provided with a display section is provided to be slidable with respect to an operation case provided with a button operation section. With the sliding operation of the display case, transition is made between an exposed state in which the button operation section is exposed and a concealed state in which the button operation section is concealed by the display case.

Further, an antenna storing section of the operation case stores a first compression coil spring. Due to the biasing force of the first compression coil spring, the display case is biased in the direction of transition from the concealed state to the exposed state. Accordingly, the sliding operation for bringing the mobile communication terminal into the exposed state is easily performed.

SUMMARY OF THE INVENTION

In this type of mobile communication terminal disclosed in Patent Document 1, however, the display case provided with the display section slidingly moves parallel to the operation case provided with the button operation section. Therefore, the button operation section and the display section are parallel to each other, and there arises an issue of difficulty in viewing the display section while operating the button operation section.

The present invention has been made in view of the above-described issue. It is desirable in the present invention to provide a mobile terminal device which brings a sliding operation type mobile device into an open state such that a case provided with a display section is obliquely inclined with respect to an input operation surface of a keyboard, to thereby make it easy to view the display section while operating the keyboard.

To address the above-described issue, a mobile terminal device according to an embodiment of the present invention includes a first case configured to include a display section, a second case configured to include a keyboard, and a slide holding mechanism configured to, in accordance with sliding movement of the first case with respect to the second case in the opening direction from a closed state in which the first case is substantially fully superimposed on the second case, expose at least a part of the keyboard of the second case and bring the cases into an open state in which the first case is inclined with respect to the second case.

Further, the slide holding mechanism includes a slide pin, a guide shaft, a biasing member, an arm member, and a guide plate. The slide pin has a substantially cylindrical shape, and is configured to include guide shaft insertion holes piercing through one side surface portion and the other side surface portion thereof. The guide shaft is inserted in the guide shaft insertion holes of the slide pin to hold the slide pin to be movable along the longitudinal direction of the guide shaft and rotatable along the circumferential direction of the guide shaft. The biasing member has one end portion connected to the slide pin and the other end portion connected to the second case to bias the slide pin in the opening direction, to thereby rotate the slide pin along the circumferential direction of the guide shaft. The arm member has one end portion connected to the slide pin and the other end portion connected to the first case to hold the slide pin to be movable along the longitudinal direction of the guide shaft and rotatable along the circumferential direction of the guide shaft. The guide plate is provided to the second case with the slide pin inserted therein, and includes a guide hole which, in the closed state of the cases, regulates the rotation of the slide pin along the circumferential direction of the guide shaft, and which, when the cases are brought into the open state, removes the regulation and allows the slide pin to rotate along the circumferential direction of the guide shaft, to thereby allow the first case to incline with respect to the second case in accordance with the rotation.

According to the embodiment of the present invention as described above, during the shift from the closed state in which the cases are substantially fully superimposed on each other to the open state in which predetermined portions of the cases are superimposed on each other, the slide holding mechanism holds the cases to be slidingly movable. Further, in the open state of the cases, the first case is inclined such that a non-keyboard-side side surface portion of the first case, toward which the first case moves in the operation of bringing the cases into the open state, is higher in height position than a keyboard-side side surface portion of the first case, which is opposite to the non-keyboard-side side surface portion.

In the open state of the sliding operation type mobile device, therefore, the case including the display section can be obliquely inclined with respect to an input operation surface of the keyboard.

According to the embodiment of the present invention, the case including the display section can be obliquely inclined with respect to the input operation surface of the keyboard in the open state of the sliding operation type mobile device. Accordingly, it is possible to make it easy to view the display section while operating the keyboard.

BRIEF DESCRIPTION OF THE DRAWINGS

FIG. 7 is a diagram for explaining a slide groove portion provided to a first case of the mobile phone according to the first embodiment;

FIG. 8 is a diagram illustrating the mobile phone according to the first embodiment in the closed state, wherein a hook portion of the keyboard and the keyboard locking member are engaged with each other;

DESCRIPTION OF THE PREFERRED EMBODIMENTS

The present invention is applicable to a sliding operation type mobile phone which slidingly moves first and second cases into an open or closed state.

First Embodiment

Figure 1:
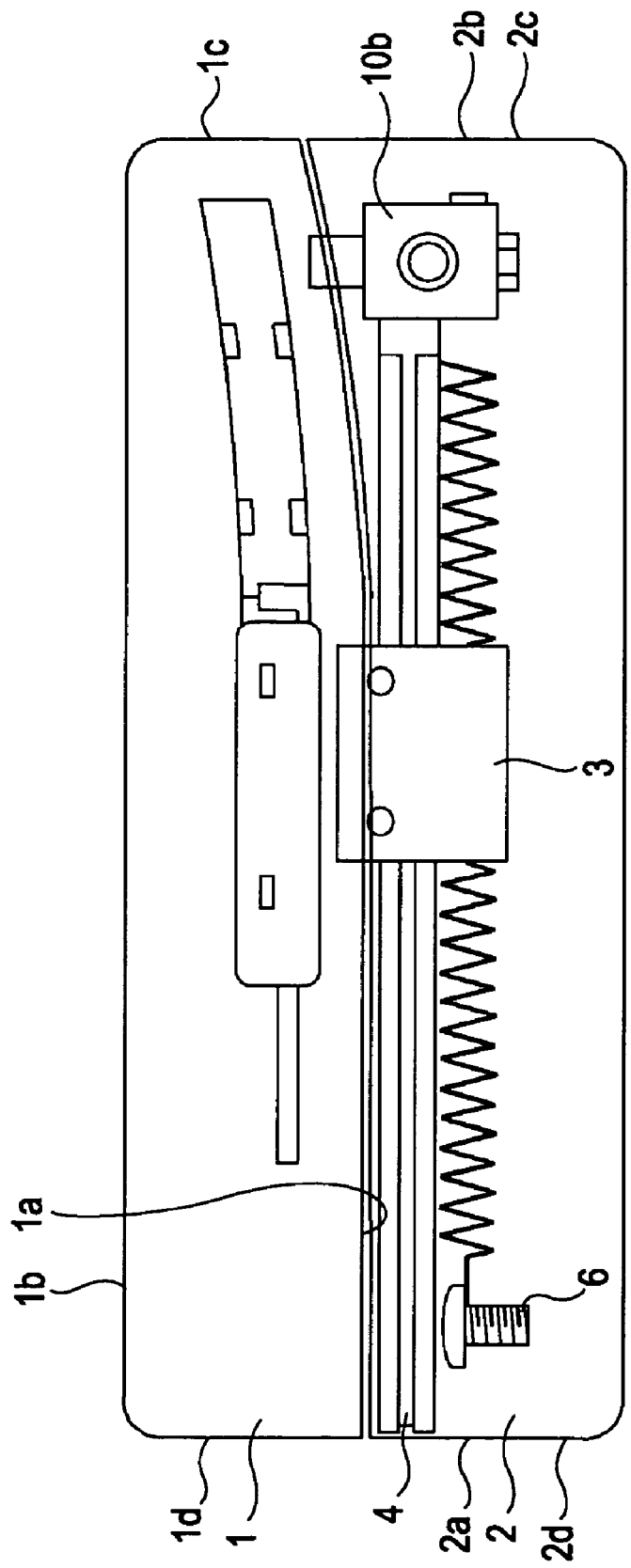
FIG. 1 is a diagram of main parts of a mobile phone according to a first embodiment of the present invention in the closed state, as perspectively viewed from the side of a right surface portion of the mobile phone.
Figure 2:
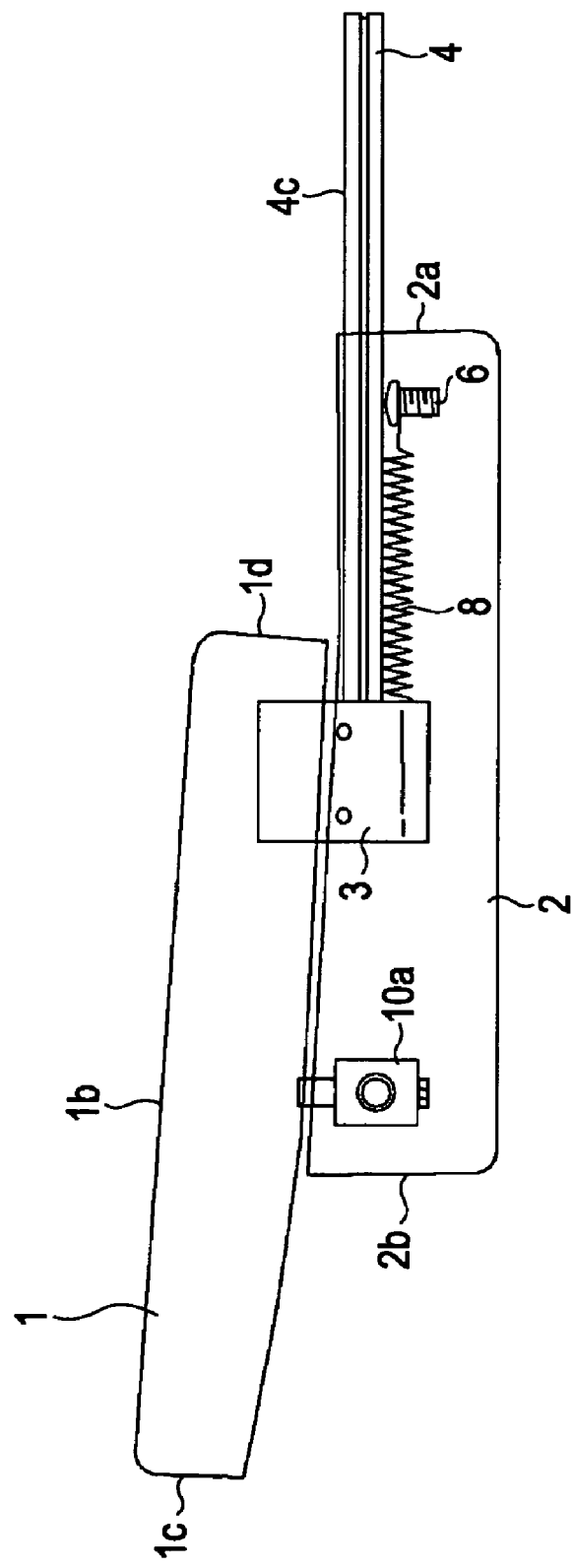
FIG. 2 is a diagram of main parts of the mobile phone according to the first embodiment in the open state, as perspectively viewed from the side of a left surface portion of the mobile phone.
Figure 3:
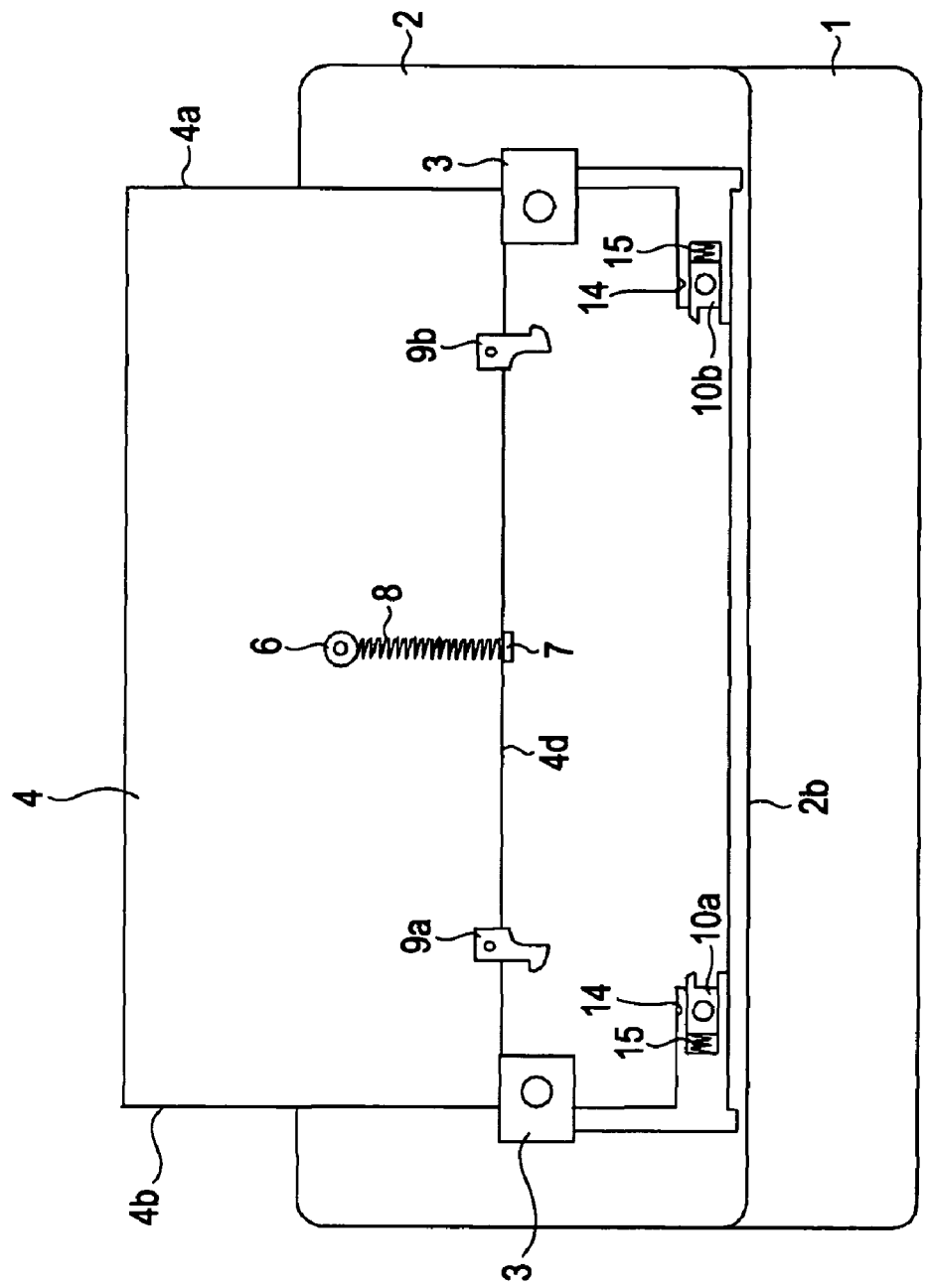
FIG. 3 is a diagram of main parts of the mobile phone according to the first embodiment in the open state, as perspectively viewed from the side of a bottom surface portion of the mobile phone.

[Configuration of Mobile Phone according to First Embodiment] FIG. 1 illustrates a mobile phone according to a first embodiment of the present invention in the closed state. FIGS. 2 and 3 illustrate the mobile phone according to the first embodiment in the open state. FIG. 1 is a diagram of main parts of the mobile phone in the closed state, as perspectively viewed from the side of a right surface portion of the mobile phone. Further, FIG. 2 is a diagram of main parts of the mobile phone in the open state, as perspectively viewed from the side of a left surface portion of the mobile phone. Further, FIG. 3 is a diagram of main parts of the mobile phone in the open state, as perspectively viewed from the side of a bottom surface portion of the mobile phone.

As observed in these FIGS. 1 to 3, the present mobile phone includes a first case 1 having a substantially rectangular box shape, a second case 2 having a substantially rectangular box shape approximately the same in size as the first case 1, and a slide holding mechanism 3 which holds the cases 1 and 2 to be slidingly movable during the shift from the closed state in which the cases 1 and 2 are substantially fully superimposed on each other (see FIG. 1) to the open state in which predetermined portions of the cases 1 and 2 are superimposed on each other (see FIGS. 2 and 3).

In the first case 1, a display surface 1b opposite to a sliding contact surface 1a which slidingly contacts with the second case 2 is provided with a display section, such as a liquid crystal display section and an organic EL (Electro Luminescence) display section, for example. In the present mobile phone, therefore, the display section is constantly exposed both in the closed state and the open state of the cases 1 and 2.

Figure 4:
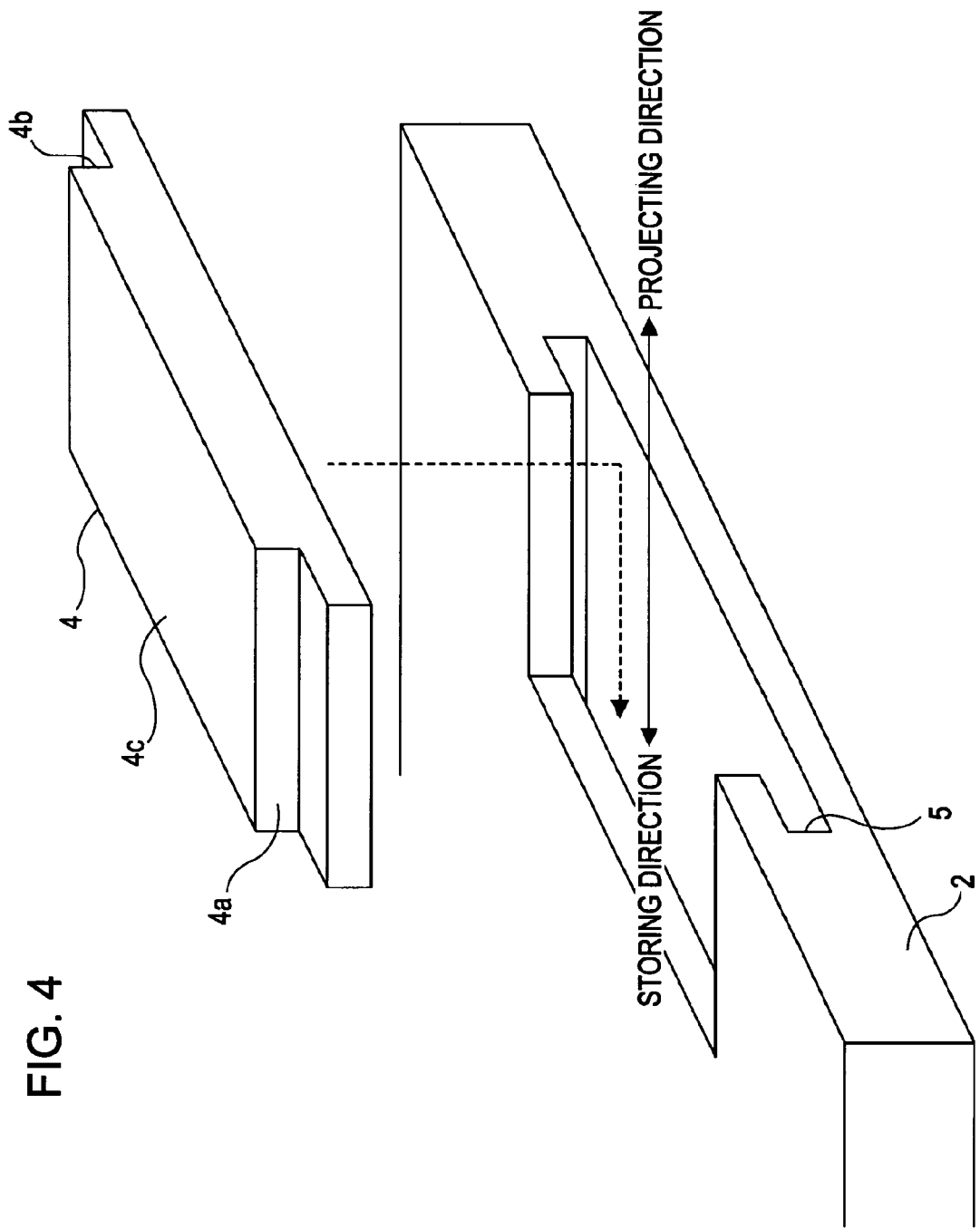
FIG. 4 is a diagram for explaining a configuration which stores a keyboard in a second case of the mobile phone according to the first embodiment.

The second case 2 stores a keyboard 4 having a substantially rectangular plate shape. Specifically, in the keyboard 4, each of lateral end portions 4a and 4b is processed to have a recess, as illustrated in FIG. 4. The second case 2 is provided with a keyboard insertion opening 5 having a shape fitting the recesses provided to the keyboard 4. The end portions 4a and 4b each processed to have a recess are inserted into the keyboard insertion opening 5. Thereby, the keyboard 4 is stored in the second case 2 with an operation surface 4c of the keyboard 4 exposed.

Each of the lateral end portions 4a and 4b is processed to have a recess. Therefore, with the keyboard 4 stored in the second case 2 via the keyboard insertion opening 5, the movement of the keyboard 4 in the thickness direction of the second case 2 is suppressed. Accordingly, the keyboard 4 is allowed to move only in a storing direction and a projecting direction indicated by arrows in FIG. 4, i.e., move in the lateral directions of the second case 2.

Further, one end of the keyboard 4 is screwed into the second case 2 by a screw 6, as illustrated in FIG. 1, and the other end of the keyboard 4 is biased in the projecting direction by a spring member 8 screwed by a screw 7 at a substantial center of a longitudinal end portion 4d of the keyboard 4 on the storing side, as illustrated in FIG. 3.

Further, as illustrated in FIG. 3, the keyboard 4 is provided with a pair of hook portions 9a and 9b located at respective positions somewhat near the lateral end portions 4b and 4a of the keyboard 4, respectively, with the screw 7 located at the center between the hook portions 9a and 9b projecting in the storing direction from the longitudinal end portion 4d of the keyboard 4 on the storing side.

Further, as illustrated in FIGS. 1 to 3, the second case 2 is provided with a pair of keyboard locking members 10a and 10b fixedly provided at respective positions corresponding to the hook portions 9a and 9b, respectively, along a longitudinal end portion 2b on the non-projecting side opposite to a longitudinal end portion 2a on the projecting side of the keyboard 4.

Although the keyboard 4 is provided with the pair of hook portions 9a and 9b in the present example, the keyboard 4 may be provided with only one hook portion or three or more hook portions. Similarly, although the second case 2 is provided with the pair of keyboard locking members 10a and 10b in the present example, the second case 2 may be provided with only one keyboard locking member or three or more keyboard locking members.

Figure 5:
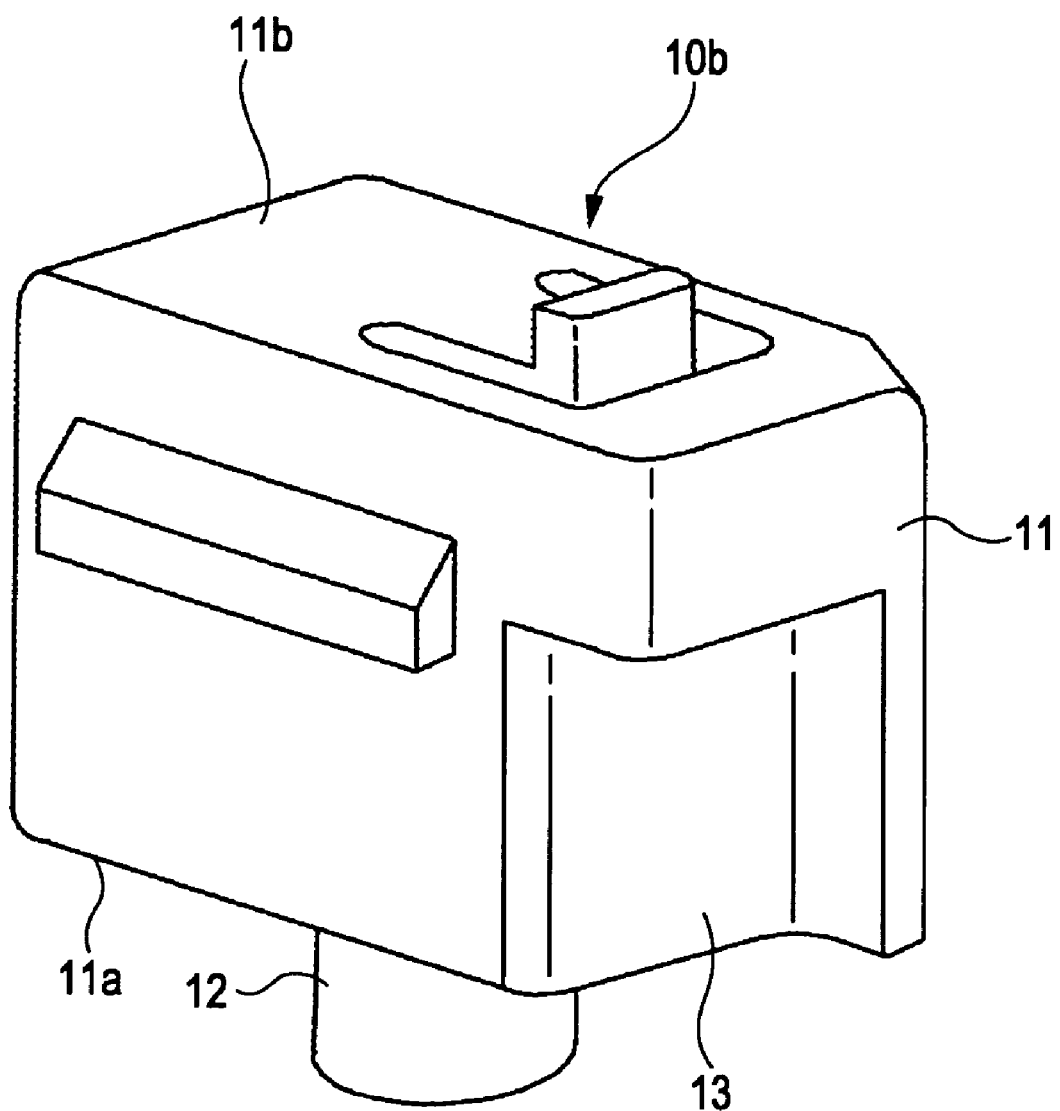
FIG. 5 is a perspective view of a keyboard locking member provided to the second case of the mobile phone according to the first embodiment.

FIG. 5 illustrates a perspective view of the keyboard locking member 10b. The keyboard locking member 10a is similar in configuration to the keyboard locking member 10b. Therefore, the following description should be referred to for an understanding of the configuration of the keyboard locking member 10a.

As illustrated in this FIG. 5, the keyboard locking member 10b includes a body 11 having a substantially rectangular parallelepiped shape, a projecting portion 12 provided to project from a substantial center of an upper surface portion 11a of the body 11, and an engaging portion 13 which engages with the hook portion 9b.

Figure 6A:
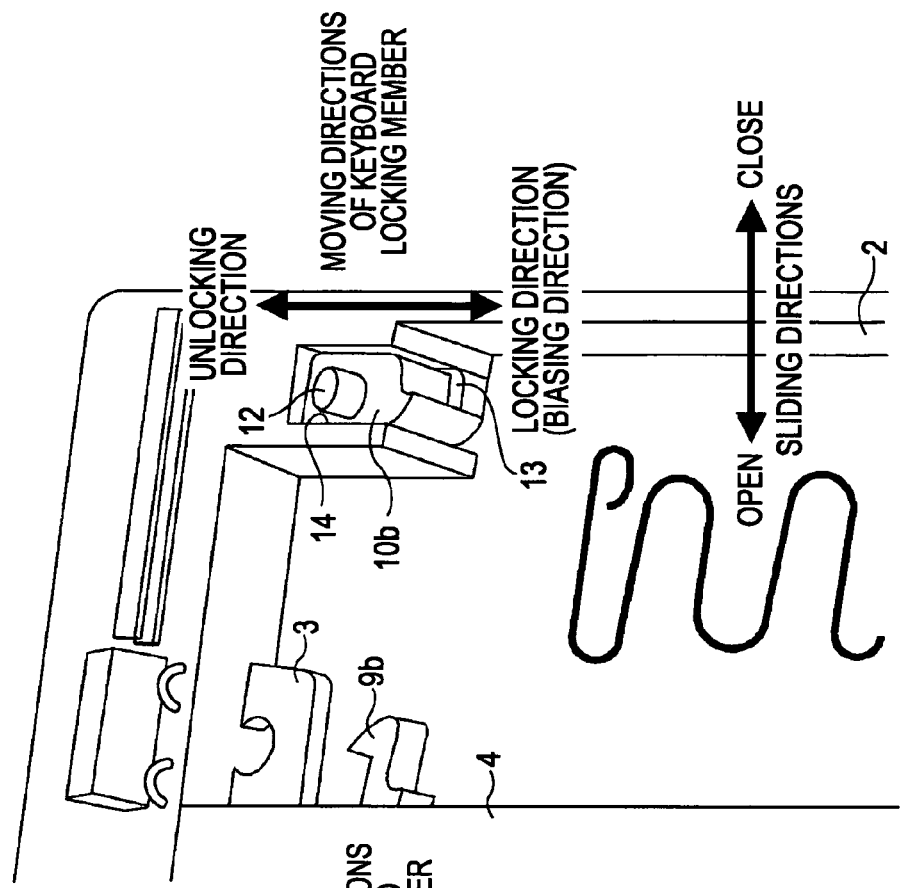
FIGS. 6A and 6B are diagrams for explaining the installation of the keyboard locking member to the second case of the mobile phone according to the first embodiment.
Figure 6B:
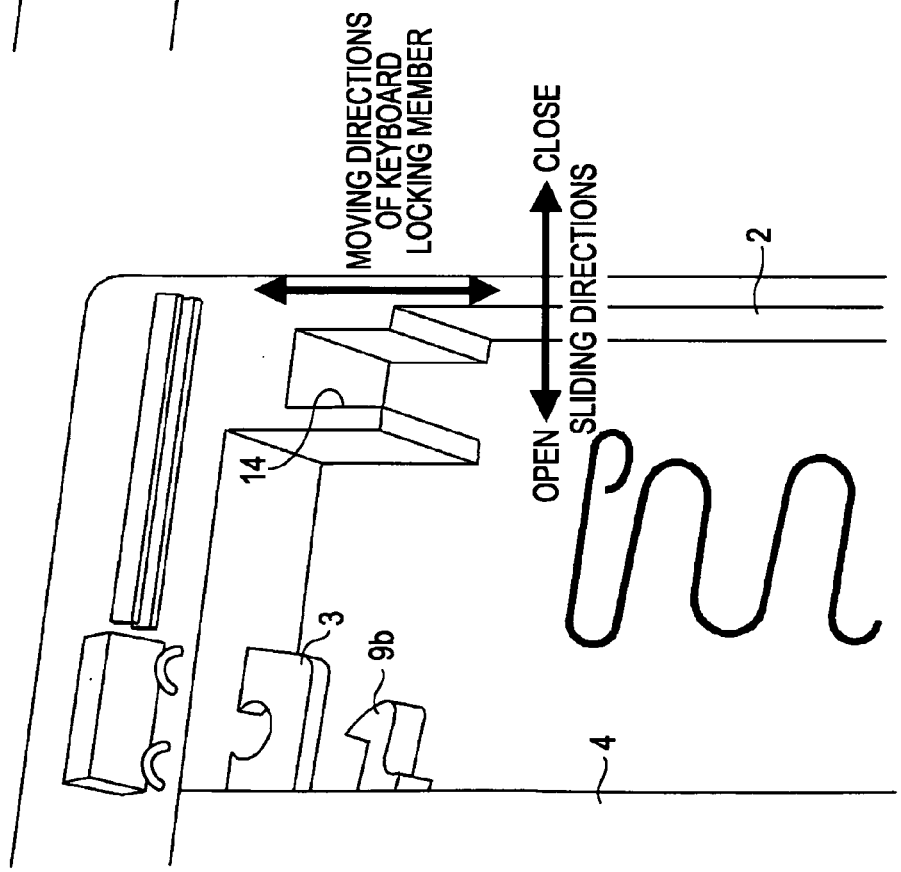

The second case 2 is provided with a slide holding opening 14 illustrated in FIG. 6A at each of the respective positions of the keyboard locking members 10a and 10b. The keyboard locking member 10b is inserted into the corresponding slide holding opening 14 from a bottom surface portion 11b of the body 11 illustrated in FIG. 5. Thereby, the keyboard locking member 10b is provided to the second case 2 to be movable only in directions perpendicular to sliding directions of the second case 2, as illustrated in FIG. 6B.

That is, the keyboard locking member 10b is provided to the second case 2 to be movable only in a locking direction in which the engaging portion 13 of the keyboard locking member 10b and the hook portion 9b provided to the keyboard 4 engage with each other and an unlocking direction in which the engaging portion 13 of the keyboard locking member 10b and the hook portion 9b provided to the keyboard 4 disengage from each other.

Further, as illustrated in FIG. 3, the keyboard locking member 10b is inserted in the slide holding opening 14 together with a spring member 15. Thereby, the keyboard locking member 10b is provided to the second case 2 to be biased in the direction of engaging with the hook portion 9b.

Meanwhile, as illustrated in FIG. 7, the sliding contact surface 1a of the first case 1, which slidingly contacts with the second case 2, is provided with a slide groove portion 16 extending in the sliding directions of the first case 1 to allow the projecting portion 12 of the keyboard locking member 10b to slidingly move therein. It should be understood that another slide groove portion 16 is also provided to the first case 1 to correspond to the projecting portion 12 of the keyboard locking member 10a. For an understanding of the configuration thereof, the following description should be referred to.

The slide groove portion 16 includes a locking groove portion 17 and an unlocking groove portion 18. When the cases 1 and 2 are brought into the closed state, the locking groove portion 17 allows the keyboard locking member 10b to move via the projecting portion 12 in the direction of making the engaging portion 13 of the keyboard locking member 10b and the hook portion 9b engaged with each other (the locking direction). The unlocking groove portion 18 is provided to communicate with the locking groove portion 17. When the cases 1 and 2 are brought into the open state, the unlocking groove portion 18 allows the keyboard locking member 10b to move via the projecting portion 12 in the direction of making the engaging portion 13 of the keyboard locking member 10b disengaged from the hook portion 9b (the unlocking direction).

As described later, when the cases 1 and 2 are brought into the closed state, the slide groove portions 16 allow the keyboard locking members 10a and 10b to move in the locking direction via the respective projecting portions 12, and the keyboard 4 is stored in the second case 2. Meanwhile, when the cases 1 and 2 are brought into the open state, the slide groove portions 16 allow the keyboard locking members 10a and 10b to move in the unlocking direction via the respective projecting portions 12, and the keyboard 4 stored in the second case 2 projects outside the second case 2.

The diameter of the projecting portions 12 is set to be less than the width of the slide groove portions 16 such that, when the respective projecting portions 12 of the keyboard locking members 10a and 10b are inserted in the slide groove portions 16, the keyboard locking members 10a and 10b can move in the locking and unlocking directions, i.e., move in the width directions of the slide groove portions 16 (i.e., the keyboard locking members 10a and 10b can move in the locking and unlocking directions due to some clearance secured between each of the projecting portions 12 and the corresponding slide groove portion 16).

Further, as illustrated in FIG. 1, in the first case 1, the area from the vicinity of a substantial center of the first case 1 to a non-keyboard-side side surface portion 1c is processed to be inclined such that the thickness of the non-keyboard-side side surface portion 1c is less than the thickness of a keyboard-side side surface portion 1d.

Meanwhile, as illustrated in FIG. 1, in the second case 2, the area from the vicinity of a substantial center of the second case 2 to a non-keyboard-projecting-side side surface portion 2c is processed to be inclined such that the thickness of the non-keyboard-projecting-side side surface portion 2c is more than the thickness of a keyboard-projecting-side side surface portion 2d, wherein the non-keyboard-projecting-side side surface portion 2c is opposite to the keyboard-projecting-side side surface portion 2d, from which the keyboard 4 projects.

As described later, in the closed state of the cases 1 and 2 of the present mobile phone, due to the respective inclinations provided to the cases 1 and 2, the thickness combining the thickness of the non-keyboard-side side surface portion 1c of the first case 1 and the thickness of the non-keyboard-projecting-side side surface portion 2c of the second case 2 is substantially the same as the thickness combining the thickness of the keyboard-side side surface portion 1d of the first case 1 and the thickness of the keyboard-projecting-side side surface portion 2d of the second case 2.

When the cases 1 and 2 are brought into the open state, however, due to the effect of the respective inclinations provided to the cases 1 and 2, the first case 1 is slidingly moved into an obliquely inclined state such that the height position of the non-keyboard-side side surface portion 1c of the first case 1 is higher than the height position of the keyboard-side side surface portion 1d of the first case 1, as illustrated in FIG. 2. Accordingly, the visibility of the display section provided to the first case 1 is ensured.

[Sliding Operations of Mobile Phone according to First Embodiment] Subsequently, description will be made of sliding operations of the mobile phone according to the first embodiment having the configuration as described above.

Figure 9:
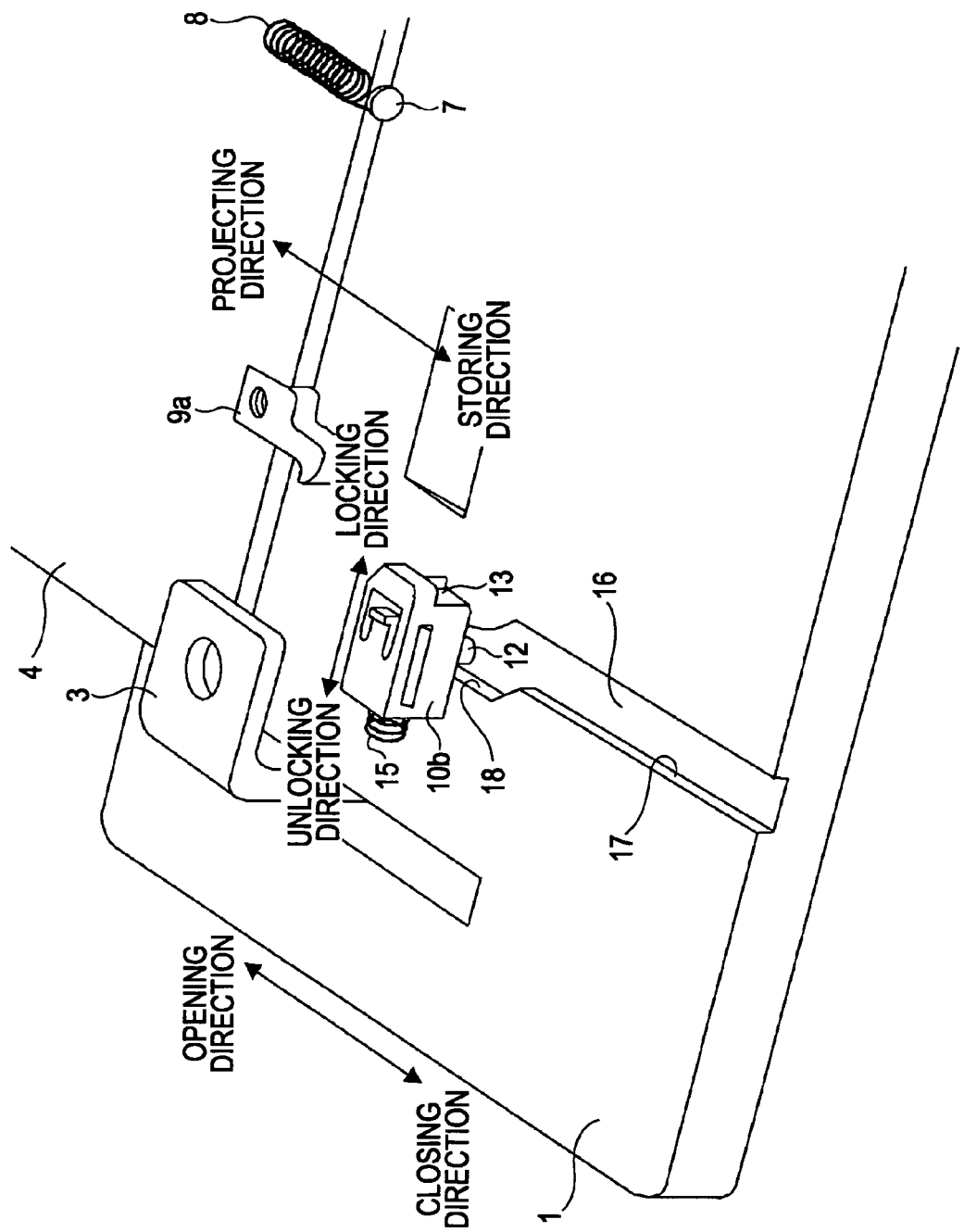
FIG. 9 is a diagram illustrating the mobile phone according to the first embodiment in the open state, wherein the hook portion of the keyboard is disengaged from the keyboard locking member.

[Sliding Operation for Bringing Cases into Open State from Closed State] Description will be first made of a sliding operation for bringing the cases 1 and 2 into the open state illustrated in FIG. 2 from the closed state illustrated in FIG. 1. FIG. 8 is a diagram illustrating only main parts in the closed state of the cases 1 and 2. FIG. 9 is a diagram illustrating only main parts in the open state of the cases 1 and 2.

In the closed state of the cases 1 and 2, the cases 1 and 2 are substantially fully superimposed on each other, and the keyboard 4 is stored in the second case 2, as illustrated in FIG. 1. Further, when the cases 1 and 2 are brought into the closed state, the keyboard locking members 10a and 10b are biased in the locking direction by the respective spring members 15 illustrated in FIG. 8. Thereby, the respective projecting portions 12 of the keyboard locking members 10a and 10b move in the locking direction within the locking groove portions 17 of the slide groove portions 16. As a result, the keyboard locking members 10a and 10b move in the locking direction via the respective projecting portions 12.

Thereby, the hook portions 9a and 9b provided to the keyboard 4 stored in the second case 2 in the closed state engage with the respective engaging portions 13 of the keyboard locking members 10a and 10b. Accordingly, the mobile phone is placed in the closed state in which the cases 1 and 2 are substantially fully superimposed on each other with the keyboard 4 stored and held in the second case 2.

Then, in the closed state, the first case 1 is applied with force in a lateral direction opposite to the projecting direction of the keyboard 4, and the second case 2 is applied with force in a lateral direction corresponding to the projecting direction of the keyboard 4. Thereby, the cases 1 and 2 slidingly move in the lateral directions opposite to each other (the cases 1 and 2 slidingly move in the respective opening directions). Accordingly, the keyboard locking members 10a and 10b move in the opening direction while being engaged with the hook portions 9a and 9b of the keyboard 4 illustrated in FIG. 8, with the respective projecting portions 12 moving along the locking groove portions 17 of the slide groove portions 16.

Then, as the cases 1 and 2 are further slidingly moved in the respective opening directions, the respective projecting portions 12 of the keyboard locking members 10a and 10b reach the unlocking groove portions 18 of the slide groove portions 16 illustrated in FIG. 9. The unlocking groove portions 18 have a shape for allowing the keyboard locking members 10a and 10b to move in the unlocking direction. Therefore, the unlocking groove portions 18 allow the keyboard locking members 10a and 10b to move in the unlocking direction against the biasing force of the spring members 15 via the respective projecting portions 12.

As the keyboard locking members 10a and 10b move in the unlocking direction, the hook portions 9a and 9b provided to the keyboard 4 disengage from the respective engaging portions 13 of the keyboard locking members 10a and 10b.

As described above, the keyboard 4 is biased in the projecting direction by the spring member 8. Therefore, when the hook portions 9a and 9b disengage from the respective engaging portions 13 of the keyboard locking members 10a and 10b, the keyboard 4 projects outside the second case 2 due to the biasing force of the spring member 8. Thereby, the mobile phone is placed in the open state illustrated in FIG. 2.

The keyboard 4 and the second case 2 are provided with a not-illustrated stopper which stops the projection of the keyboard 4 at a predetermined position.

As described above, in the open state of the cases 1 and 2 of the mobile phone, the keyboard 4 stored in the second case 2 projects outside the second case 2. In the open state, therefore, an input operation surface having an area substantially the same as the area of the second case 2 can be secured, even though the cases 1 and 2 are superimposed on each other.

Due to the increased input operation surface of the keyboard 4, therefore, it is possible to increase the intervals between keys on the keyboard 4, and thus to facilitate the input operation. Further, due to the increased input operation surface of the keyboard 4, it is possible to provide the keyboard 4 with keys physically larger than existing keys, and thus to facilitate the input operation. Alternatively, due to the increased input operation surface of the keyboard 4, it is possible to provide the keyboard 4 with keys larger in number than existing keys.

Herein, as described above, the area of the first case 1 from the vicinity of the substantial center of the first case 1 to the non-keyboard-side side surface portion 1c is processed to be inclined such that the thickness of the non-keyboard-side side surface portion 1c is less than the thickness of the keyboard-side side surface portion 1d, as illustrated in FIG. 1.

Further, the area of the second case 2 from the vicinity of the substantial center of the second case 2 to the non-keyboard-projecting-side side surface portion 2c is processed to be inclined such that the thickness of the non-keyboard-projecting-side side surface portion 2c is more than the thickness of the keyboard-projecting-side side surface portion 2d, as illustrated in FIG. 1, wherein the non-keyboard-projecting-side side surface portion 2c is opposite to the keyboard-projecting-side side surface portion 2d, from which the keyboard 4 projects.

Further, the slide holding mechanism 3 allows the cases 1 and 2 to slidingly move in the respective opening directions along the respective inclinations of the cases 1 and 2. Thereby, the first case 1 is brought into the obliquely inclined state such that the height position of the non-keyboard-side side surface portion 1c of the first case 1 is higher than the height position of the keyboard-side side surface portion 1d of the first case 1, as illustrated in FIG. 2.

Therefore, the angle of inclination of the display surface 1b of the first case 1 provided with the display section can be set to be an ergonomically favorable angle of inclination with respect to the operation surface 4c of the keyboard 4. Accordingly, it is possible to ensure favorable visibility of the display section.

[Sliding Operation for Bringing Cases into Closed State from Open State] Subsequently, description will be made of a sliding operation for bringing the cases 1 and 2 into the closed state illustrated in FIG. 1 from the open state illustrated in FIG. 2.

In this case, in the open state illustrated in FIG. 2, the first case 1 is applied with force in the lateral direction corresponding to the projecting direction of the keyboard 4, and the keyboard 4 projecting from the second case 2 is applied with force in the lateral direction opposite to the projecting direction of the keyboard 4. Thereby, the first case 1 moves in the projecting direction of the keyboard 4, and the keyboard 4 moves in the storing direction illustrated in FIG. 9 against the biasing force of the spring member 8.

Herein, in the operation of bringing the cases 1 and 2 into the closed state from the open state, the first case 1 moves in the projecting direction of the keyboard 4. Therefore, when the hook portions 9a and 9b provided to the keyboard 4 reach the respective positions of the keyboard locking members 10a and 10b provided to the second case 2, the respective projecting portions 12 of the keyboard locking members 10a and 10b move from the unlocking groove portions 18 to the locking groove portions 17 of the slide groove portions 16. Thereby, the keyboard locking members 10a and 10b move in the locking direction via the respective projecting portions 12.

Accordingly, the hook portions 9a and 9b having reached the respective positions of the keyboard locking members 10a and 10b engage with the respective engaging portions 13 of the keyboard locking members 10a and 10b, and the keyboard 4 is stored in the second case 2.

Then, in the state in which the keyboard 4 is stored in the second case 2, the first case 1 is further applied with the force in the lateral direction corresponding to the projecting direction of the keyboard 4. Then, the respective projecting portions 12 of the keyboard locking members 10a and 10b move along the locking groove portions 17 of the slide groove portions 16, with the hook portions 9a and 9b of the keyboard 4 engaged with the respective engaging portions 13 of the keyboard locking members 10a and 10b. As a result, the mobile phone is placed in the closed state in which the cases 1 and 2 are substantially fully superimposed on each other, as illustrated in FIG. 1.

The cases 1 and 2 are processed to be inclined as described above such that the thickness combining the thickness of the non-keyboard-side side surface portion 1c of the first case 1 and the thickness of the non-keyboard-projecting-side side surface portion 2c of the second case 2 is substantially the same as the thickness combining the thickness of the keyboard-side side surface portion 1d of the first case 1 and the thickness of the keyboard-projecting-side side surface portion 2d of the second case 2. In the closed state, therefore, the mobile phone as a whole maintains a substantially rectangular parallelepiped shape, even though the cases 1 and 2 are processed to be inclined as described above.

Effects of First Embodiment

As obvious from the above description, the mobile phone according to the first embodiment is configured such that, in the open state of the cases 1 and 2, the keyboard 4 stored in the second case 2 projects outside the second case 2. In the open state, therefore, the input operation surface having an area substantially the same as the area of the second case 2 can be secured, even though the cases 1 and 2 are superimposed on each other.

Due to the increased input operation surface of the keyboard 4, therefore, it is possible to increase the intervals between the keys on the keyboard 4, and thus to facilitate the input operation. Further, due to the increased input operation surface of the keyboard 4, it is possible to provide the keyboard 4 with keys physically larger than existing keys, and thus to facilitate the input operation. Alternatively, due to the increased input operation surface of the keyboard 4, it is possible to provide the keyboard 4 with keys larger in number than existing keys.

Further, the area from the vicinity of the substantial center of the first case 1 to the non-keyboard-side side surface portion 1c is processed to be inclined such that the thickness of the non-keyboard-side side surface portion 1c of the first case 1 is less than the thickness of the keyboard-side side surface portion 1d. Further, the area from the vicinity of the substantial center of the second case 2 to the non-keyboard-projecting-side side surface portion 2c is processed to be inclined such that the thickness of the non-keyboard-projecting-side side surface portion 2c of the second case 2 is more than the thickness of the keyboard-projecting-side side surface portion 2d.

Further, the slide holding mechanism 3 allows the cases 1 and 2 to slidingly move in the respective opening directions along the respective inclinations of the cases 1 and 2. Thereby, the first case 1 is brought into the obliquely inclined state such that the height position of the non-keyboard-side side surface portion 1c of the first case 1 is higher than the height position of the keyboard-side side surface portion 1d of the first case 1.

Therefore, the angle of inclination of the display surface 1b of the first case 1 provided with the display section can be set to be an ergonomically favorable angle of inclination with respect to the operation surface 4c of the keyboard 4. Accordingly, it is possible to ensure favorable visibility of the display section.

Second Embodiment

Subsequently, a mobile phone according to a second embodiment of the present invention will be described. The mobile phone according to the second embodiment is capable of performing semiautomatic and smooth opening and closing operations of the cases 1 and 2. Further, in the open state of the cases 1 and 2 of the mobile phone, the first case 1 is inclined such that the height position of the non-keyboard-side side surface portion is of the first case 1 is higher than the height position of the keyboard-side side surface portion 1d of the first case 1, to thereby further improve the visibility of the display section.

The mobile phone according to the foregoing first embodiment and the mobile phone according to the second embodiment are different only in this respect. Therefore, only the difference between the two embodiments will be described below, and redundant description will be omitted.

Figure 10:
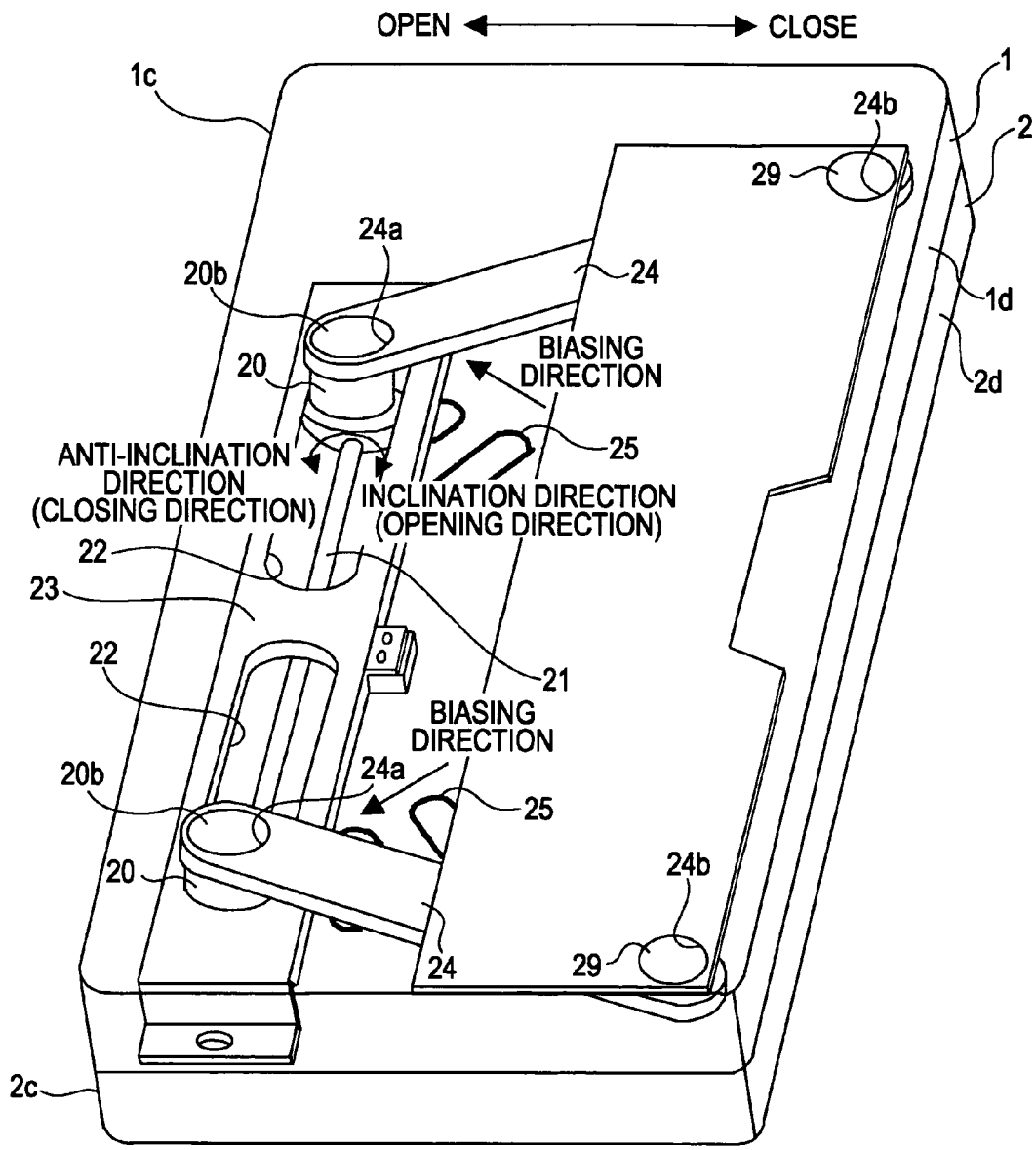
FIG. 10 is a diagram of main parts of a mobile phone according to a second embodiment of the present invention in the closed state, as perspectively viewed from the side of a first case of the mobile phone.
Figure 11:
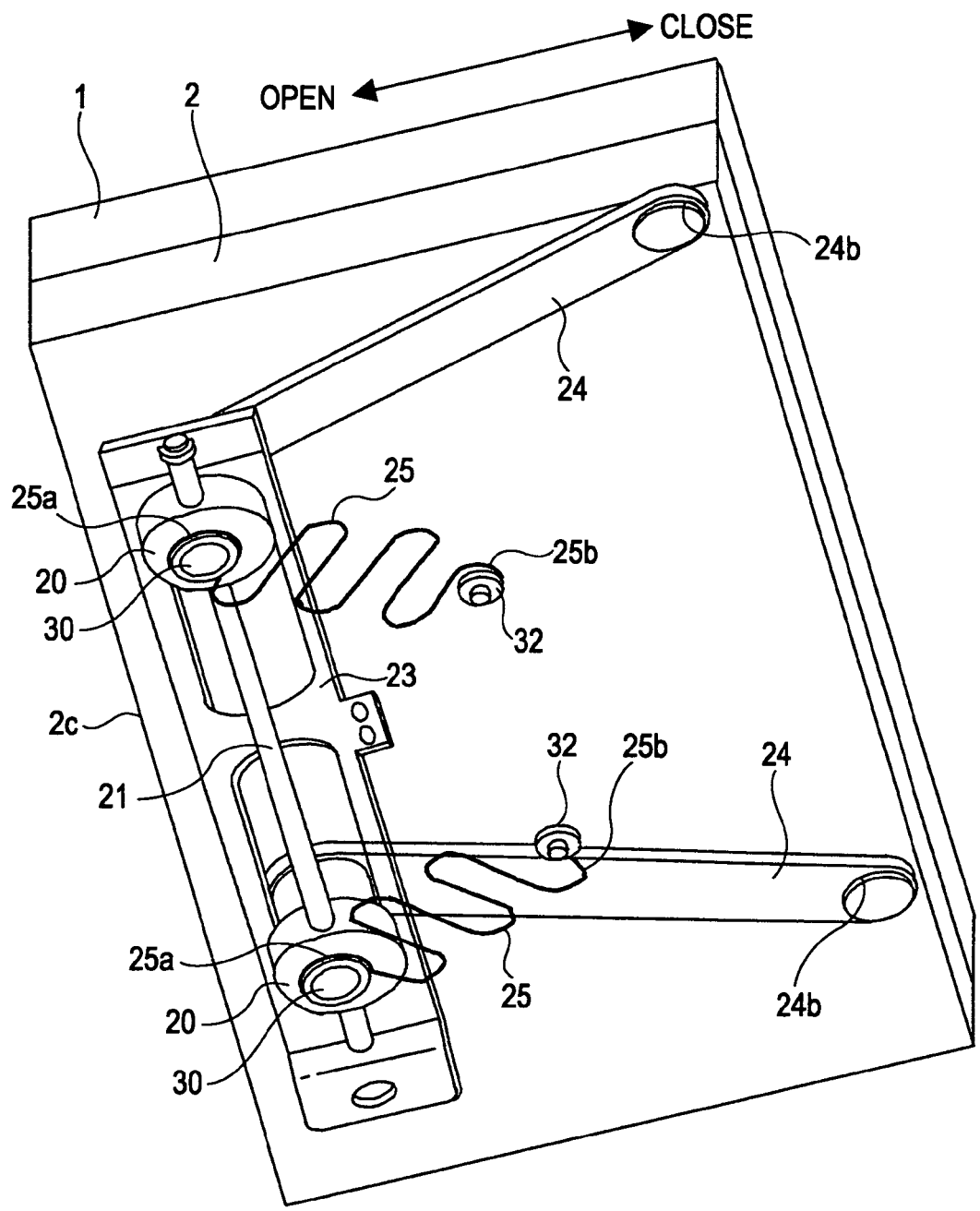
FIG. 11 is a diagram of main parts of the mobile phone according to the second embodiment of the present invention in the closed state, as perspectively viewed from the side of a second case of the mobile phone.
Figure 12:
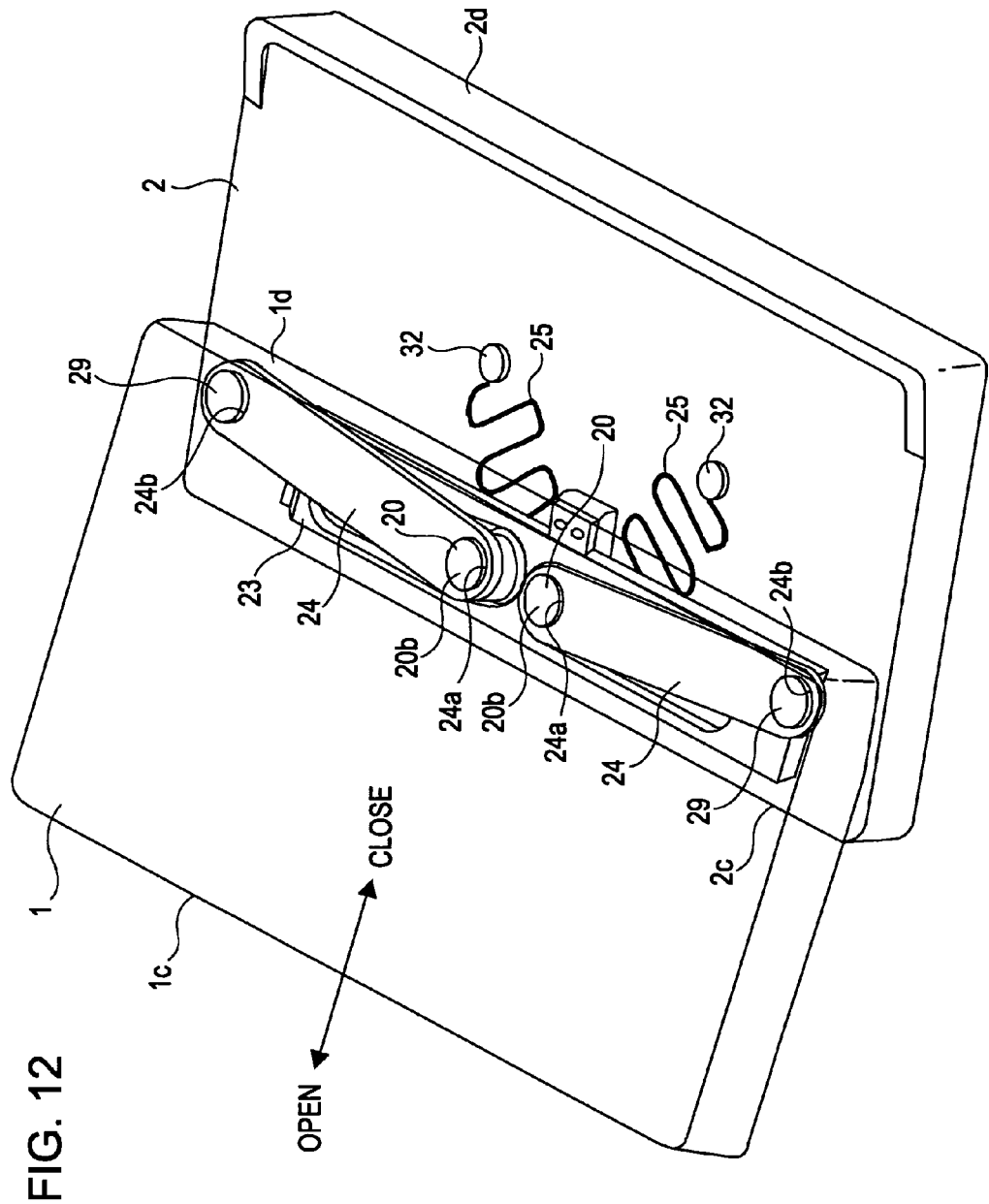
FIG. 12 is a diagram of main parts of the mobile phone according to the second embodiment of the present invention in the open state, as perspectively viewed from the side of the first case of the mobile phone.

[Configuration of Mobile Phone according to Second Embodiment] FIGS. 10 and 11 present diagrams in perspective of main parts of the mobile phone according to the second embodiment in the closed state. FIG. 12 presents a diagram in perspective of main parts of the mobile phone according to the second embodiment in the open state. Among these drawings, FIG. 10 is a perspective view of the mobile phone in the closed state, as viewed from the side of the first case 1, FIG. 11 is a perspective view of the mobile phone in the closed state, as viewed from the side of the second case 2, and FIG. 12 is a perspective view of the mobile phone in the open state, as viewed from the side of the first case 1.

In FIGS. 10 to 12, the illustration of the keyboard 4, the keyboard locking members 10a and 10b, and so forth described in the foregoing first embodiment is omitted for easier understanding of the structure and operation of the mobile phone according to the second embodiment.

As observed in FIGS. 10 to 12, the mobile phone according to the second embodiment includes a slide holding mechanism including a pair of slide pins 20, a guide shaft 21 holding the slide pins 20 to be movable along the longitudinal direction of the guide shaft 21 and rotatable along the circumferential direction of the guide shaft 21, a guide plate 23 including a pair of guide holes 22 having a length allowing the slide pins 20 to move along the guide shaft 21 between the closed state and the open state of the cases 1 and 2, a pair of arm members 24 each having one end portion connected to the corresponding slide pin 20 and the other end portion connected to the first case 1, and a pair of spring members 25 each having one end portion connected to the corresponding slide pin 20 and the other end portion connected to the second case 2.

Figure 13:
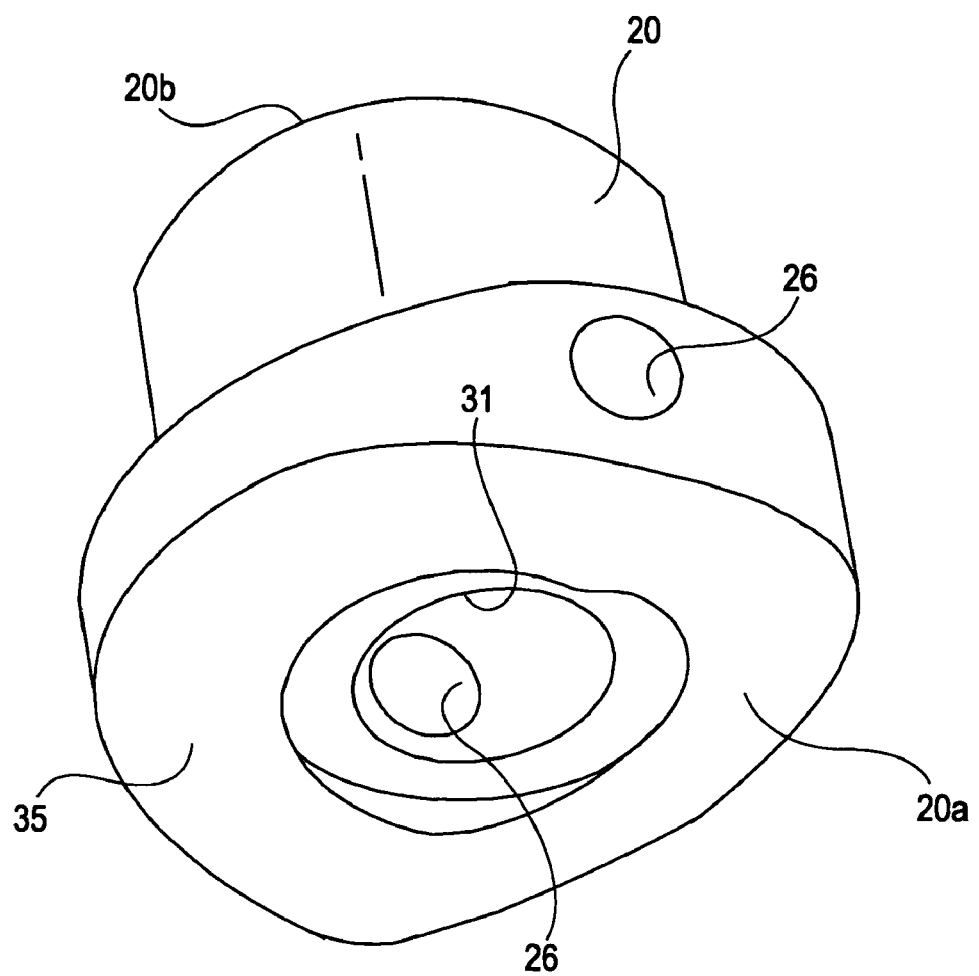
FIG. 13 is a perspective view of a slide pin provided to a slide holding mechanism of the mobile phone according to the second embodiment.

As illustrated in FIG. 13, each of the slide pins 20 has a substantially cylindrical shape, and includes guide shaft insertion holes 26 piecing through one side surface portion and the other side surface portion thereof along the radial direction thereof. Further, a bottom surface portion 20a of each of the slide pins 20 is provided with a spring fixing pin insertion hole 31 extending in a direction perpendicular to the radial direction of the slide pin 20.

Further, as described later, when the cases 1 and 2 of the mobile phone are brought into the open state, the first case 1 is inclined such that the height position of the non-keyboard-side side surface portion 1c of the first case 1 is higher than the height position of the keyboard-side side surface portion 1d. In this operation, the slide pins 20 rotate along the circumferential direction of the guide shaft 21. This rotation may cause the bottom surface portion 20a of each of the slide pins 20 to come into contact with the second case 2 and prevent the first case 1 from being inclined. Therefore, a portion of the bottom surface portion 20a of the slide pin 20 coming into contact with the second case 2 in the operation of bringing the cases 1 and 2 into the open state is provided with an inclined portion 35 processed to have an inclination corresponding to the inclination of the first case 1.

In the present example, the portion of the bottom surface portion 20a of each of the slide pins 20 coming into contact with the second case 2 in the operation of bringing the cases 1 and 2 into the open state is processed to have the inclination corresponding to the inclination of the first case 1. The above-described inclination provided to the bottom surface portion 20a of each of the slide pins 20 may be replaced by a contact preventing hole provided to the second case 2 to prevent the second case 2 from coming into contact with the bottom surface portion 20a of the slide pin 20 (i.e., a hole for receiving the bottom surface portion 20a of the slide pin 20 in the operation of bringing the cases 1 and 2 into the open state).

The guide shaft 21 is a cylindrical rod-like member having a diameter slightly less than the diameter of the guide shaft insertion holes 26 provided to the slide pins 20. As illustrated in FIGS. 10 to 12, the guide shaft 21 is inserted in the guide shaft insertion holes 26 of the slide pins 20 to hold the slide pins 20 to be movable along the guide shaft 21 and rotatable along the circumferential direction of the guide shaft 21.

Figure 14:
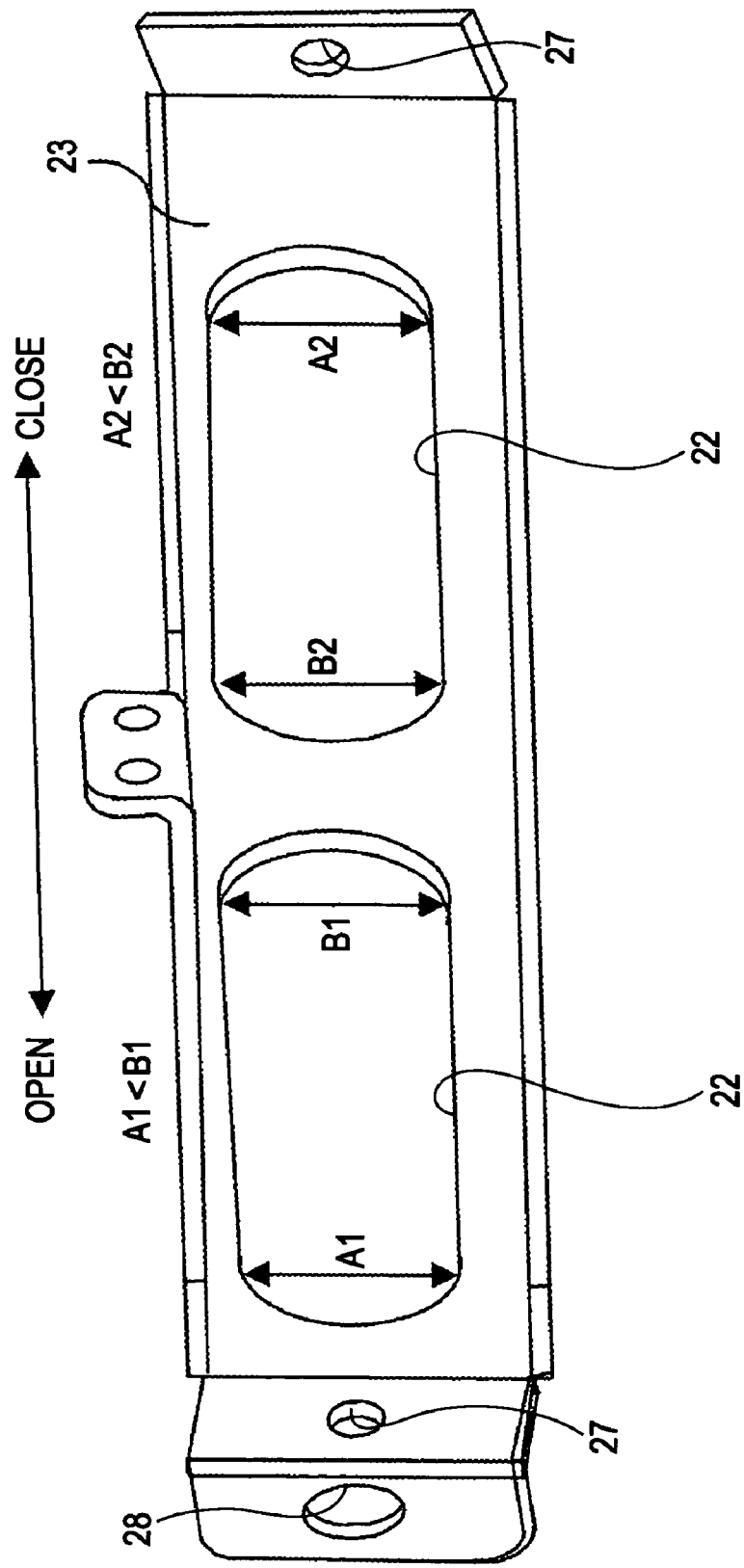
FIG. 14 is a perspective view of a guide plate provided to the slide holding mechanism of the mobile phone according to the second embodiment.

As illustrated in FIG. 14, the guide plate 23 as a whole has a rectangular plate shape, and includes the pair of guide holes 22 each extending along the longitudinal direction of the guide plate 23 and having a substantially elongated elliptical shape. Further, the guide plate 23 includes a pair of guide shaft holding holes 27 for holding the guide shaft 21 along the longitudinal direction of the guide plate 23. One end portion and the other end portion of the guide shaft 21 inserted in the guide shaft insertion holes 26 of the slide pins 20 are inserted in the respective guide shaft holding holes 27.

Further, one lateral end portion (or both lateral end portions) of the guide plate 23 includes a screw hole 28 for screwing the guide plate 23. The guide plate 23 is fixedly screwed along the non-keyboard-projecting-side side surface portion 2c of the second case 2 by a screw through the screw hole 28, as illustrated in FIGS. 10 to 12.

The slide pins 20 are inserted in the respective guide holes 22 of the guide plate 23, as illustrated in FIGS. 10 to 12. The guide holes 22 guide the movement of the slide pins 20 along the guide shaft 21 between the closed state and the open state of the cases 1 and 2.

Further, between the closed state and the open state of the cases 1 and 2, the slide pins 20 move in the opening and closing directions within the respective guide holes 22 of the guide plate 23 illustrated in FIG. 14. In the open state of the cases 1 and 2, the slide pins 20 are inclined due to the above-described rotation thereof along the circumferential direction of the guide shaft 21. The guide plate 23 is fixed to the second case 2. In accordance with the inclination of the slide pins 20, therefore, the diameter of the slide pins 20 in the guide holes 22 of the guide plate 23 changes between the closed state and the open state of the cases 1 and 2.

That is, the slide pins 20 in the guide holes 22 are larger in diameter in the open state of the cases 1 and 2, in which the slide pins 20 are inclined, than in the closed state of the cases 1 and 2, in which the slide pins 20 are not inclined.

Therefore, the width in the lateral direction of the guide holes 22 of the guide plate 23 is designed such that widths B1 and B2 of respective inside portions of the guide holes 22, in which the slide pins 20 are located in the open state of the cases 1 and 2, are greater than widths A1 and A2 of respective outside portions of the guide holes 22, in which the slide pins 20 are located in the closed state of the cases 1 and 2. In other words, each of the guide holes 22 of the guide plate 23 is formed such that the width in the lateral direction thereof is different between the inside portion and the outside portion to absorb the change in diameter of the corresponding slide pin 20, which occurs in accordance with the inclination of the slide pin 20 in the operation of bringing the cases 1 and 2 into the open state.

Further, as illustrated in FIGS. 10 to 12, each of the arm members 24 has a rectangular plate shape, and includes a slide pin insertion hole 24a located near one end thereof and piercing through in the vertical direction, and a case fixing hole 24b located near the other end thereof and piercing through in the vertical direction.

The slide pin insertion hole 24a provided near the one end of the arm member 24 is slightly larger in diameter than an upper surface portion 20b of the corresponding slide pin 20 opposite to the bottom surface portion 20a provided with the guide shaft 21. With the upper surface portion 20b of the slide pin 20 inserted in the slide pin insertion hole 24a, the arm member 24 is connected to the slide pin 20 to be rotatable along the circumferential direction of the slide pin 20.

Further, a fixing pin 29 having an even circumferential surface is inserted in the case fixing hole 24b provided near the other end of the arm member 24. The arm members 24 are fixed, via the respective fixing pins 29, near two corners of the first case 1 on the closing side. Further, due to the even circumferential surface of the fixing pins 29, the arm members 24 are rotatable along the circumferential direction of the fixing pins 29.

Further, as illustrated in FIGS. 10 to 12, each of the spring members 25 has a so-called meandering shape, i.e., the spring member 25 as a whole has a shape of multiple S-shapes combined together. As illustrated in FIG. 11, one end portion 25a of the spring member 25 is fixed to the corresponding slide pin 20 by a spring fixing pin 30 inserted in the spring fixing pin insertion hole 31 of the slide pin 20. Further, as illustrated in FIGS. 11 and 12, the other end portion 25b of the spring member 25 is fixed to the second case 2 by a screw 32.

As indicated by arrows in FIG. 10, the spring members 25 constantly bias the slide pins 20 in the direction of opening the cases 1 and 2. Therefore, when the cases 1 and 2 are brought into the closed state, the spring members 25 bias the slide pins 20 in the direction of increasing the interval between the slide pins 20. Meanwhile, when the cases 1 and 2 are brought into the open state, the spring members 25 bias the slide pins 20 in the direction of reducing the interval between the slide pins 20. Accordingly, the mobile phone is capable of performing semiautomatic and smooth opening and closing operations of the cases 1 and 2.

[Sliding Operations of Mobile Phone according to Second Embodiment] Subsequently, description will be made of sliding operations of the mobile phone according to the second embodiment having the configuration as described above.

[Sliding Operation for Bringing Cases into Open State from Closed State] Description will be first made of a sliding operation for bringing the cases 1 and 2 into the open state illustrated in FIG. 12 from the closed state illustrated in FIGS. 10 and 11.

In the closed state of the cases 1 and 2, the slide pins 20 are biased by the spring members 25 in the direction of increasing the interval between the slide pins 20. Further, in the closed state of the cases 1 and 2, the slide pins 20 are located in the respective outside portions of the guide holes 22 of the guide plate 23 illustrated in FIG. 14. The widths A1 and A2 in the lateral direction of the respective outside portions of the guide holes 22 are less than the widths B1 and B2 in the lateral direction of the respective inside portions of the guide holes 22.

In the closed state of the cases 1 and 2, therefore, the rotation of the slide pins 20 along the circumferential direction of the guide shaft 21 is regulated by the narrow-width portions of the guide holes 22 (i.e., the portions having the widths A1 and A2) against the biasing force of the spring members 25.

In this state, the first case 1 is applied with force in the opening direction illustrated in FIG. 10, and the second case 2 is applied with force in the closing direction. Then, the forces applied to the cases 1 and 2 are transmitted to the slide pins 20 via the arm members 24. Thereby, each of the slide pins 20 starts moving along the guide shaft 21 from the outside portion to the inside portion of the corresponding guide hole 22 of the guide plate 23. At the same time, the position of the one end portion 25*a* of the spring member 25 connected to the slide pin 20 also moves from the outside portion to the inside portion of the guide hole 22 in accordance with the movement of the slide pin 20.

Then, the first case 1 is further applied with the force in the opening direction, and the second case 2 is further applied with the force in the closing direction. Thereby, each of the arm members 24 moves the corresponding slide pin 20 to a position slightly inside a substantial center of the corresponding guide hole 22 of the guide plate 23. Then, the biasing direction of the spring members 25 biasing the slide pins 20 changes into the direction of reducing the interval between the slide pins 20.

That is, the respective positions of the one end portions 25*a* of the spring members 25 connected to the slide pins 20 move in accordance with the movement of the slide pins 20. Therefore, the biasing direction of the spring members 25 which bias the slide pins 20 in the direction of increasing the interval between the slide pins 20 in the closed state of the cases 1 and 2 changes into the direction of reducing the interval between the slide pins 20, when the slide pins 20 reach the respective positions slightly inside the substantial centers of the guide holes 22.

When the biasing direction of the spring members 25 changes into the direction of reducing the interval between the slide pins 20, the slide pins 20 are biased toward the respective inside portions of the guide holes 22 due to the biasing force of the spring members 25. Thereby, the slide pins 20 move until coming into contact with the respective inside sidewall portions of the guide holes 22.

Accordingly, after the cases 1 and 2 are applied with the above-described forces until being brought into a substantially half open state, the slide pins 20 automatically move until coming into contact with the respective inside sidewall portions of the guide holes 22 due to the biasing force of the spring members 25.

Herein, as described above, the spring members 25 constantly bias the slide pins 20 in the direction of opening the cases 1 and 2, as indicated by the arrows in FIG. 10. Further, the widths B1 and B2 in the lateral direction of the respective inside portions of the guide holes 22 are greater than the widths A1 and A2 in the lateral direction of the respective outside portions of the guide holes 22.

Therefore, when the slide pins 20 move and come into contact with the respective inside sidewall portions of the guide holes 22, the rotation of the slide pins 20 regulated due to the widths of the outside portions of the guide holes 22 (i.e., the widths A1 and A2) is allowed (i.e., the regulation is removed) due to the widths of the inside portions of the guide holes 22 (i.e., the widths B1 and B2) greater than the diameters of the slide pins 20. Then, due to the biasing force of the spring members 25, the slide pins 20 rotate in an inclination direction indicated by an arrow in FIG. 10 (i.e., the opening direction according to the rotation of the cases 1 and 2) along the circumferential direction of the guide shaft 21.

That is, the bottom surface portion 20*a* of each of the slide pins 20 is provided with the inclined portion 35, which has the inclination corresponding to the inclination of the first case 1 and prevents the slide pin 20 from coming into contact with the second case 2. If the above-described regulation of the slide pins 20 is removed, therefore, the slide pins 20 rotate in the inclination direction indicated by the arrow in FIG. 10 in accordance with the biasing force of the spring members 25, with the respective bottom surface portions 20*a* not coming into contact with the second case 2.

As the slide pins 20 rotate in the inclination direction, the force of the rotation is transmitted to the first case 1 via the arm members 24.

Further, the area from the vicinity of a substantial center of the first case 1 to the keyboard-side side surface portion 1*d* is processed to be inclined such that the thickness of the non-keyboard-side side surface portion 1*c* of the first case 1 is more than the thickness of the keyboard-side side surface portion 1*d*. Further, the area from the vicinity of a substantial center of the second case 2 to the keyboard-projecting-side side surface portion 2*d* is processed to be inclined such that the thickness of the non-keyboard-projecting-side side surface portion 2*c* of the second case 2 is less than the thickness of the keyboard-projecting-side side surface portion 2*d*.

Therefore, the first case 1 is pushed obliquely upward along the respective inclined portions 35 of the slide pins 20 via the arm members 24, to which the force of the rotation of the slide pins 20 has been transmitted. Thereby, the first case 1 is obliquely inclined such that the height position of the non-keyboard-side side surface portion 1*c* of the first case 1 is higher than the height position of the keyboard-side side surface portion 1*d* of the first case 1. As a result, the mobile phone is placed in the open state illustrated in FIG. 12.

According to the thus configured mobile phone, in the open state of the cases 1 and 2, the first case 1 is obliquely inclined such that the height position of the non-keyboard-side side surface portion 1*c* of the first case 1 is higher than the height position of the keyboard-side side surface portion 1*d* of the first case 1. Therefore, the angle of inclination of the display surface 1*b* of the first case 1 provided with the display section can be set to be an ergonomically favorable angle of inclination with respect to the operation surface of the keyboard provided to the second case 2. Accordingly, it is possible to ensure favorable visibility of the display section.

Further, in the mobile phone according to the second embodiment, the guide plate 23 is fixedly screwed along the non-keyboard-projecting-side side surface portion 2*c* of the second case 2. In the open state of the cases 1 and 2, therefore, the keyboard-side side surface portion 1*d* of the first case 1 and the non-keyboard-projecting-side side surface portion 2*c* of the second case 2 are substantially close to each other. Therefore, the inclination of the first case 1 in the open state can be set to be more favorable than the inclination of the first case 1 of the mobile phone according to the foregoing first embodiment. Accordingly, it is possible to ensure more favorable visibility of the display section.

Further, in the mobile phone according to the second embodiment, due to the guide plate 23 fixedly screwed along the non-keyboard-projecting-side side surface portion 2*c* of the second case 2, even in the configuration which does not include the mechanism for projecting the keyboard 4, and in which the keyboard provided to the second case 2 is exposed when the first case 1 slidingly moves in the opening direction, it is possible to increase the exposed area of the keyboard provided to the second case 2, which is exposed in the open state of the cases 1 and 2.

Accordingly, it is possible to increase the intervals between keys on the keyboard provided to the second case 2, and thus to facilitate the input operation. Further, it is possible to provide the keyboard with keys physically larger than existing keys, and thus to facilitate the input operation. Alternatively, due to the increased input operation surface of the keyboard, it is possible to provide the keyboard with keys larger in number than existing keys.

[Sliding Operation for Bringing Cases into Closed State from Open State] Subsequently, description will be made of a sliding operation for bringing the cases 1 and 2 into the closed state illustrated in FIGS. 10 and 11 from the open state illustrated in FIG. 12.

As described above, in the open state of the cases 1 and 2, the slide pins 20 are biased by the spring members 25 in the direction of reducing the interval between the slide pins 20. In this state, the first case 1 is applied with force in the closing direction illustrated in FIG. 12, and the second case 2 is applied with force in the opening direction. Then, the forces applied to the cases 1 and 2 are transmitted to the slide pins 20 via the arm members 24. Thereby, each of the slide pins 20 starts moving along the guide shaft 21 from the inside portion to the outside portion of the corresponding guide hole 22 of the guide plate 23. At the same time, the position of the one end portion 25a of the spring member 25 connected to the slide pin 20 also moves from the inside portion to the outside portion of the guide hole 22 in accordance with the movement of the slide pin 20.

Then, the first case 1 is further applied with the force in the closing direction, and the second case 2 is further applied with the force in the opening direction. Thereby, each of the arm members 24 moves the corresponding slide pin 20 to a position slightly outside the substantial center of the corresponding guide hole 22 of the guide plate 23. Then, the biasing direction of the spring members 25 biasing the slide pins 20 changes into the direction of increasing the interval between the slide pins 20.

That is, the respective positions of the one end portions 25a of the spring members 25 connected to the slide pins 20 move in accordance with the movement of the slide pins 20. Therefore, the biasing direction of the spring members 25 which bias the slide pins 20 in the direction of reducing the interval between the slide pins 20 in the open state of the cases 1 and 2 changes into the direction of increasing the interval between the slide pins 20, when the slide pins 20 reach the respective positions slightly outside the substantial centers of the guide holes 22.

When the biasing direction of the spring members 25 changes into the direction of increasing the interval between the slide pins 20, the slide pins 20 are biased toward the respective outside portions of the guide holes 22 due to the biasing force of the spring members 25. Thereby, the slide pins 20 move until coming into contact with the respective outside sidewall portions of the guide holes 22.

Accordingly, after the cases 1 and 2 are applied with the above-described forces until being brought into a substantially half closed state, the slide pins 20 automatically move until coming into contact with the respective outside sidewall portions of the guide holes 22 due to the biasing force of the spring members 25.

Herein, when the cases 1 and 2 are brought into the closed state from the open state, the first case 1 obliquely standing with respect to the second case 2 is brought back to the state in which the first case 1 is superimposed on the second case 2 to be parallel to the second case 2. Therefore, the force with which the first case 1 is superimposed on the second case 2 to be parallel to the second case 2 corresponds to the force for pushing the first case 1 in the thickness direction of the second case 2. The force for pushing the first case 1 in the thickness direction of the second case 2 is transmitted to the slide pins 20 via the arm members 24. Further, as illustrated in FIG. 14, the widths A1 and A2 in the lateral direction of the respective outside portions of the guide holes 22 of the guide plate 23 are less than the widths B1 and B2 in the lateral direction of the respective inside portions of the guide holes 22.

Therefore, as the slide pins 20 move from the inside sidewall portions to the outside sidewall portions of the guide holes 22, the width of the guide holes 22 is reduced. Further, applied with the force for pushing the first case 1 in the thickness direction of the second case 2, the slide pins 20 rotate in an anti-inclination direction illustrated in FIG. 10 (i.e., the closing direction according to the rotation of the cases 1 and 2) along the outer circumference of the guide shaft 21.

Accordingly, the slide pins 20, the regulation of which has been removed due to the widths of the inside portions of the guide holes 22, return to the state in which the rotation is regulated due to the widths of the outside portions of the guide holes 22. As a result, the cases 1 and 2 are placed in the closed state, as illustrated in FIGS. 10 and 11.

The cases 1 and 2 are processed to be inclined as described above such that the thickness combining the thickness of the non-keyboard-side side surface portion 1c of the first case 1 and the thickness of the non-keyboard-projecting-side side surface portion 2c of the second case 2 is substantially the same as the thickness combining the thickness of the keyboard-side side surface portion 1d of the first case 1 and the thickness of the keyboard-projecting-side side surface portion 2d of the second case 2. In the closed state, therefore, the mobile phone as a whole maintains a substantially rectangular parallelepiped shape, even though the cases 1 and 2 are processed to be inclined as described above.

Effects of Second Embodiment

As obvious from the above description, in the mobile phone according to the second embodiment, the slide holding mechanism of the cases 1 and 2 includes the pair of slide pins 20 and the guide shaft 21. Each of the slide pins 20 has a substantially cylindrical shape, and includes the guide shaft insertion holes 26 piercing through the one side surface portion and the other side surface portion thereof. The guide shaft 21 is inserted in the guide shaft insertion holes 26 of the slide pins 20 to hold the slide pins 20 to be movable along the longitudinal direction of the guide shaft 21 and rotatable along the circumferential direction of the guide shaft 21.

The slide holding mechanism further includes the pair of spring members 25 and the pair of arm members 24. Each of the spring members 25 has the one end portion connected to the corresponding slide pin 20 and the other end portion connected to the second case 2 to bias the slide pin 20 in the direction of opening the cases 1 and 2, to thereby rotate the slide pin 20 along the circumferential direction of the guide shaft 21. Each of the arm members 24 has the one end portion connected to the corresponding slide pin 20 and the other end portion connected to the first case 1 to hold the slide pin 20 to be movable along the longitudinal direction of the guide shaft 21 and rotatable along the circumferential direction of the guide shaft 21.

The slide holding mechanism further includes the guide plate 23 including the pair of guide holes 22. The guide plate 23 is provided to the second case 2, with the slide pins 20 inserted in the guide plate 23. In the closed state of the cases 1 and 2, the guide holes 22 regulate the rotation of the slide pins 20 in the inclination direction along the circumferential direction of the guide shaft 21, against the biasing force of the spring members 25. When the cases 1 and 2 are brought into the open state, the guide holes 22 remove the regulation and allow the slide pins 20 to rotate in the inclination direction along the circumferential direction of the guide shaft 21 in accordance with the biasing force of the spring members 25, to thereby allow the first case 1 to incline with respect to the second case 2.

In the operation of bringing the cases 1 and 2 into the open state illustrated in FIG. 12, therefore, it is possible to semi-automatically and smoothly bring the cases 1 and 2 into the open state.

Further, in the open state of the cases 1 and 2, the first case 1 is obliquely inclined with respect to the second case 2 such that the height position of the non-keyboard-side side surface portion 1c of the first case 1 is higher than the height position of the keyboard-side side surface portion 1d of the first case 1.

Therefore, the angle of inclination of the display surface 1b of the first case 1 provided with the display section can be set to be an ergonomically favorable angle of inclination with respect to the operation surface of the keyboard provided to the second case 2. Accordingly, it is possible to ensure favorable visibility of the display section.

Further, the guide plate 23 is fixedly screwed along the non-keyboard-projecting-side side surface portion 2c of the second case 2. In the open state of the cases 1 and 2, therefore, the keyboard-side side surface portion 1d of the first case 1 and the non-keyboard-projecting-side side surface portion 2c of the second case 2 are substantially close to each other. Therefore, the inclination of the first case 1 in the open state can be set to be more favorable than the inclination of the first case 1 of the mobile phone according to the foregoing first embodiment. Accordingly, it is possible to ensure more favorable visibility of the display section.

Further, due to the guide plate 23 fixedly screwed along the non-keyboard-projecting-side side surface portion 2c of the second case 2, even in the configuration which does not include the mechanism for projecting the keyboard 4, and in which the keyboard provided to the second case 2 is exposed when the first case 1 slidingly moves in the opening direction, it is possible to increase the exposed area of the keyboard provided to the second case 2, which is exposed in the open state of the cases 1 and 2.

Accordingly, it is possible to increase the intervals between the keys on the keyboard provided to the second case 2, and thus to facilitate the input operation. Further, it is possible to provide the keyboard with keys physically larger than existing keys, and thus to facilitate the input operation. Alternatively, due to the increased input operation surface of the keyboard, it is possible to provide the keyboard with keys larger in number than existing keys.

Third Embodiment

Subsequently, a mobile phone according to a third embodiment of the present invention will be described. The mobile phone according to the foregoing second embodiment includes the pair of slide pins 20, the pair of arm members 24, the pair of spring members 25, and so forth. Meanwhile, the mobile phone according to the third embodiment is configured to include a single slide pin 20, a single arm member 24, a single spring member 25, and so forth.

The mobile phone according to the foregoing second embodiment and the mobile phone according to the third embodiment are different only in this respect. Therefore, only the difference between the two embodiments will be described, and redundant description will be omitted.

Figure 15:
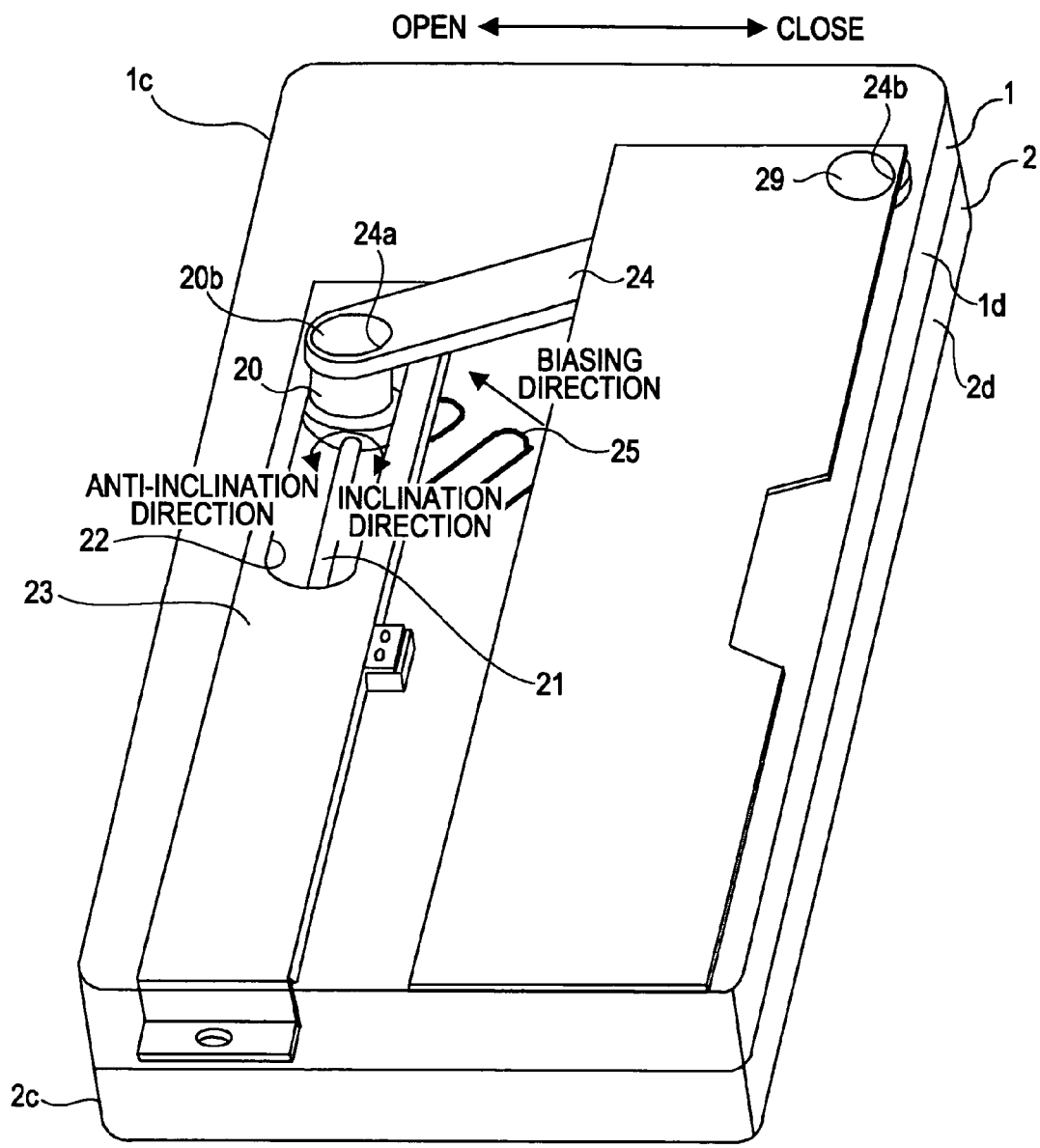
FIG. 15 is a diagram of main parts of a mobile phone according to a third embodiment of the present invention in the closed state, as perspectively viewed from the side of a first case of the mobile phone.
Figure 16:
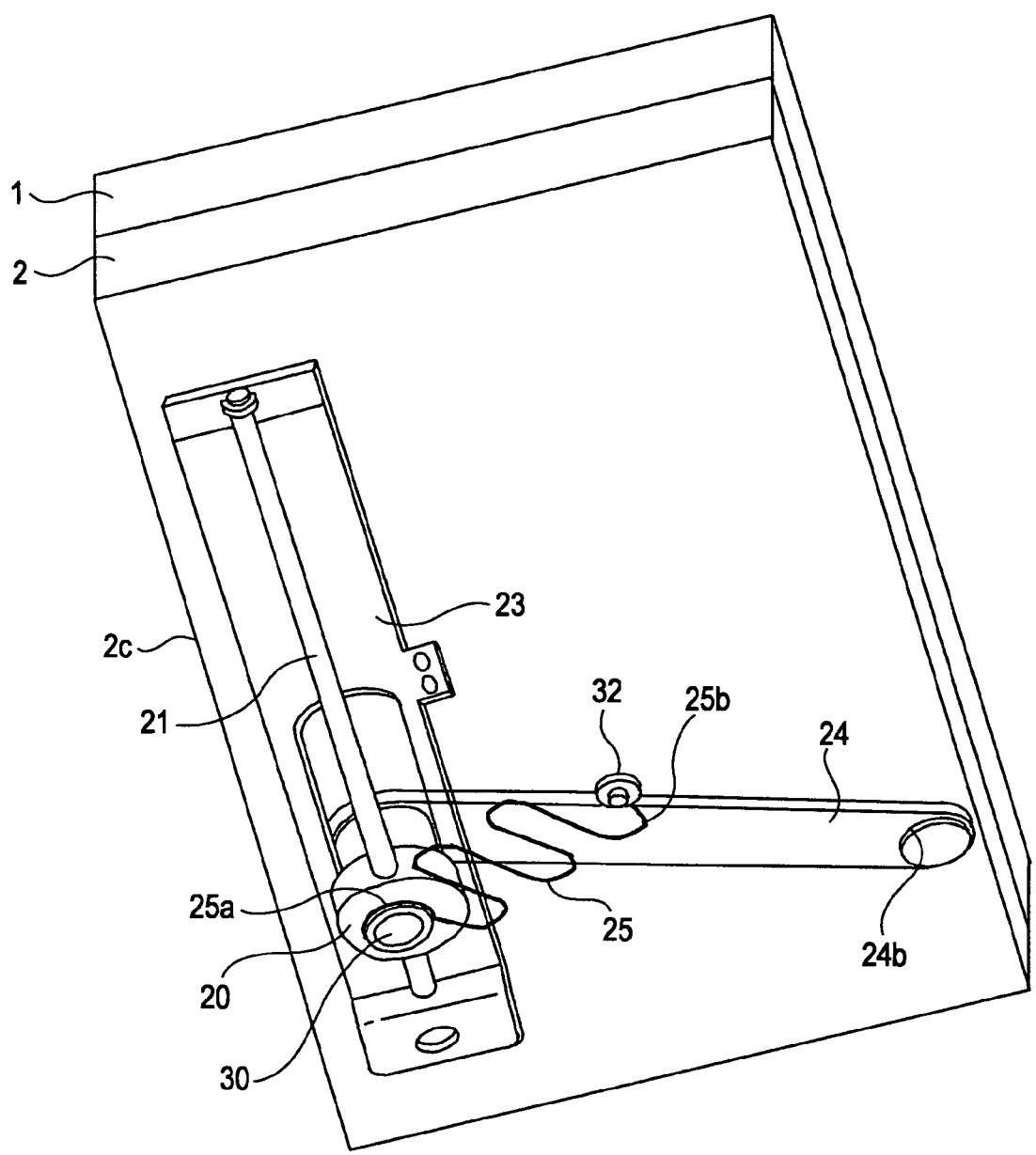
FIG. 16 is a diagram of main parts of the mobile phone according to the third embodiment of the present invention in the closed state, as perspectively viewed from the side of a second case of the mobile phone.
Figure 17:
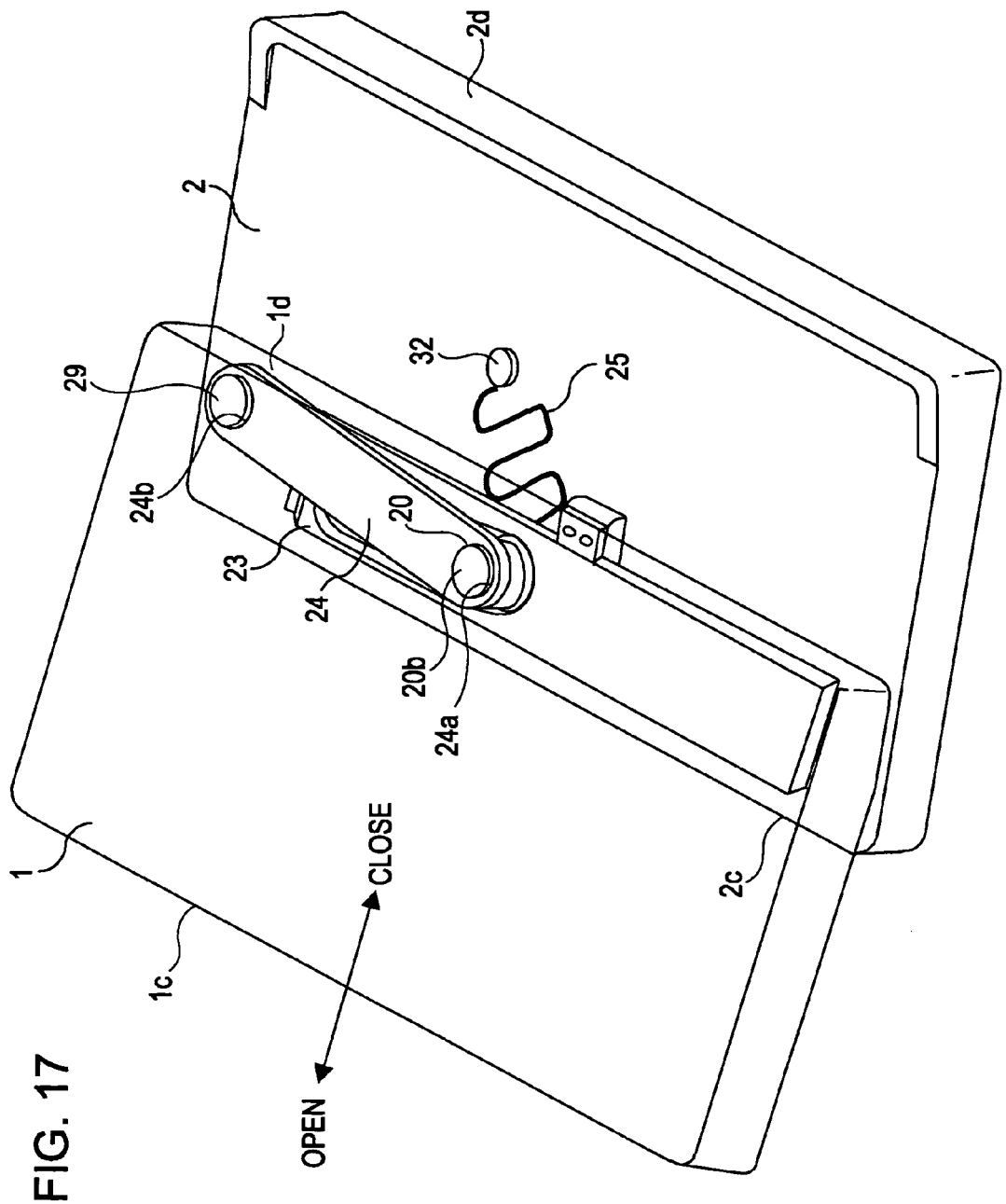
FIG. 17 is a diagram of main parts of the mobile phone according to the third embodiment of the present invention in the open state, as perspectively viewed from the side of the first case of the mobile phone.

[Configuration of Mobile Phone according to Third Embodiment] FIGS. 15 and 16 present diagrams in perspective of main parts of the mobile phone according to the third embodiment in the closed state. FIG. 17 presents a diagram in perspective of main parts of the mobile phone according to the third embodiment in the open state. Among these drawings, FIG. 15 is a perspective view of the mobile phone in the closed state, as viewed from the side of the first case 1, FIG. 16 is a perspective view of the mobile phone in the closed state, as viewed from the side of the second case 2, and FIG. 17 is a perspective view of the mobile phone in the open state, as viewed from the side of the first case 1.

In FIGS. 15 to 17, the illustration of the keyboard 4, the keyboard locking members 10a and 10b, and so forth described in the foregoing first embodiment is omitted for easier understanding of the structure and operation of the mobile phone according to the third embodiment.

As observed in FIGS. 15 to 17, the mobile phone according to the third embodiment includes a slide holding mechanism including a slide pin 20, a guide shaft 21 holding the slide pin 20 to be movable along the longitudinal direction of the guide shaft 21 and rotatable along the circumferential direction of the guide shaft 21, a guide plate 23 including a guide hole 22 having a length allowing the slide pin 20 to move along the guide shaft 21 between the closed state and the open state of the cases 1 and 2, an arm member 24 having one end portion connected to the slide pin 20 and the other end portion connected to the first case 1, and a spring member 25 having one end portion connected to the slide pin 20 and the other end portion connected to the second case 2.

As illustrated in FIG. 13, the slide pin 20 has a substantially cylindrical shape, and includes guide shaft insertion holes 26 piecing through one side surface portion and the other side surface portion thereof along the radial direction thereof. Further, a bottom surface portion 20a of the slide pin 20 is provided with a spring fixing pin insertion hole 31 extending in a direction perpendicular to the radial direction of the slide pin 20.

Further, as described later, when the cases 1 and 2 of the mobile phone are brought into the open state, the first case 1 is inclined such that the height position of the non-keyboard-side side surface portion 1c of the first case 1 is higher than the height position of the keyboard-side side surface portion 1d. In this operation, the slide pin 20 rotates along the circumferential direction of the guide shaft 21. This rotation may cause the bottom surface portion 20a of the slide pin 20 to come into contact with the second case 2 and prevent the first case 1 from being inclined. Therefore, a portion of the bottom surface portion 20a of the slide pin 20 coming into contact with the second case 2 in the operation of bringing the cases 1 and 2 into the open state is provided with an inclined portion 35 processed to have an inclination corresponding to the inclination of the first case 1.

In the present example, the portion of the bottom surface portion 20a of the slide pin 20 coming into contact with the second case 2 in the operation of bringing the cases 1 and 2 into the open state is processed to have the inclination corresponding to the inclination of the first case 1. The above-described inclination provided to the bottom surface portion 20a of the slide pin 20 may be replaced by a contact preventing hole provided to the second case 2 to prevent the second case 2 from coming into contact with the bottom surface portion 20a of the slide pin 20 (i.e., a hole for receiving the bottom surface portion 20a of the slide pin 20 in the operation of bringing the cases 1 and 2 into the open state).

The guide shaft 21 is a cylindrical rod-like member having a diameter slightly less than the diameter of the guide shaft insertion holes 26 provided to the slide pin 20. As illustrated in FIGS. 15 to 17, the guide shaft 21 is inserted in the guide shaft insertion holes 26 of the slide pin 20 to hold the slide pin 20 to be movable along the guide shaft 21 and rotatable along the circumferential direction of the guide shaft 21.

Figure 18:
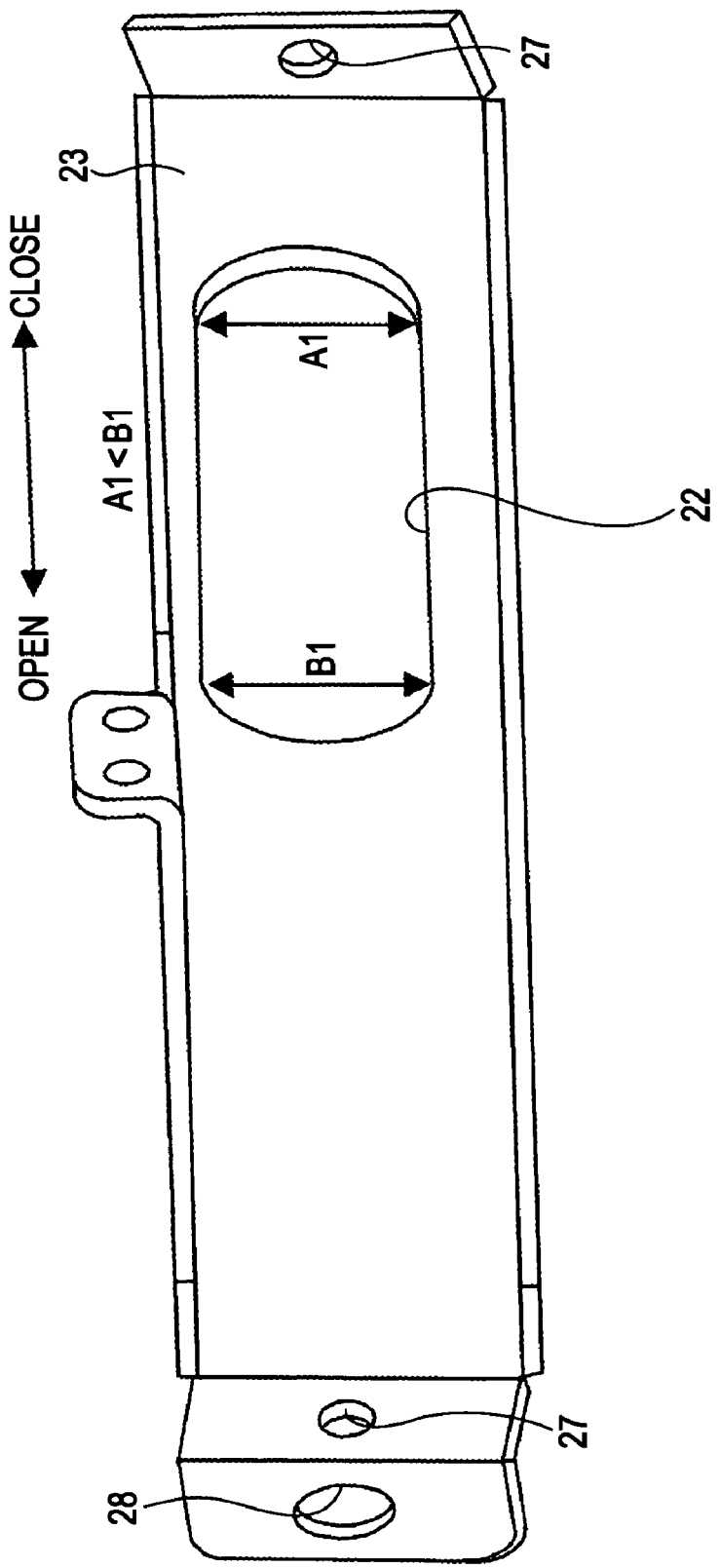
FIG. 18 is a perspective view of a guide plate provided to a slide holding mechanism of the mobile phone according to the third embodiment.

As illustrated in FIG. 18, the guide plate 23 as a whole has a rectangular plate shape, and includes the guide hole 22 extending along the longitudinal direction of the guide plate 23 and having a substantially elongated elliptical shape. Further, the guide plate 23 includes a pair of guide shaft holding holes 27 for holding the guide shaft 21 along the longitudinal direction of the guide plate 23. One end portion and the other end portion of the guide shaft 21 inserted in the guide shaft insertion holes 26 of the slide pin 20 are inserted in the guide shaft holding holes 27.

Further, one lateral end portion (or both lateral end portions) of the guide plate 23 includes a screw hole 28 for screwing the guide plate 23. The guide plate 23 is fixedly screwed along the non-keyboard-projecting-side side surface portion 2c of the second case 2 by a screw through the screw hole 28, as illustrated in FIGS. 15 to 17.

The slide pin 20 is inserted in the guide hole 22 of the guide plate 23, as illustrated in FIGS. 15 to 17. The guide hole 22 guides the movement of the slide pin 20 along the guide shaft 21 between the closed state and the open state of the cases 1 and 2.

Further, between the closed state and the open state of the cases 1 and 2, the slide pin 20 moves in the opening and closing directions within the guide hole 22 of the guide plate 23 illustrated in FIG. 18. In the open state of the cases 1 and 2, the slide pin 20 is inclined due to the above-described rotation thereof along the circumferential direction of the guide shaft 21. The guide plate 23 is fixed to the second case 2. In accordance with the inclination of the slide pin 20, therefore, the diameter of the slide pin 20 in the guide hole 22 of the guide plate 23 changes between the closed state and the open state of the cases 1 and 2.

That is, the slide pin 20 in the guide hole 22 is larger in diameter in the open state of the cases 1 and 2, in which the slide pin 20 is inclined, than in the closed state of the cases 1 and 2, in which the slide pin 20 is not inclined.

Therefore, the width in the lateral direction of the guide hole 22 of the guide plate 23 is designed such that a width B1 of an inside portion of the guide hole 22, in which the slide pin 20 is located in the open state of the cases 1 and 2, is greater than a width A1 of an outside portion of the guide hole 22, in which the slide pin 20 is located in the closed state of the cases 1 and 2. In other words, the guide hole 22 of the guide plate 23 is formed such that the width in the lateral direction thereof is different between the inside portion and the outside portion to absorb the change in diameter of the slide pin 20, which occurs in accordance with the inclination of the slide pin 20 in the operation of bringing the cases 1 and 2 into the open state.

Further, as illustrated in FIGS. 15 to 17, the arm member 24 has a rectangular plate shape, and includes a slide pin insertion hole 24a located near one end thereof and piercing through in the vertical direction, and a case fixing hole 24b located near the other end thereof and piercing through in the vertical direction.

The slide pin insertion hole 24a provided near the one end of the arm member 24 is slightly larger in diameter than an upper surface portion 20b of the slide pin 20 opposite to the bottom surface portion 20a provided with the guide shaft 21. With the upper surface portion 20b of the slide pin 20 inserted in the slide pin insertion hole 24a, the arm member 24 is connected to the slide pin 20 to be rotatable along the circumferential direction of the slide pin 20.

Further, a fixing pin 29 having an even circumferential surface is inserted in the case fixing hole 24b provided near the other end of the arm member 24. The arm member 24 is fixed, via the fixing pin 29, near a corner of the first case 1 on the closing side. Further, due to the even circumferential surface of the fixing pin 29, the arm member 24 is rotatable along the circumferential direction of the fixing pin 29.

Further, as illustrated in FIGS. 15 to 17, the spring member 25 has a so-called meandering shape, i.e., the spring member 25 as a whole has a shape of multiple S-shapes combined together. As illustrated in FIG. 16, one end portion 25a of the spring member 25 is fixed to the slide pin 20 by a spring fixing pin 30 inserted in the spring fixing pin insertion hole 31 of the slide pin 20. Further, as illustrated in FIGS. 16 and 17, the other end portion 25b of the spring member 25 is fixed to the second case 2 by a screw 32.

As indicated by an arrow in FIG. 15, the spring member 25 constantly biases the slide pin 20 in the direction of opening the cases 1 and 2. Therefore, when the cases 1 and 2 are brought into the closed state, the spring member 25 biases the slide pin 20 in the direction of moving the slide pin 20 toward the outside portion of the guide hole 22 of the guide plate 23. Meanwhile, when the cases 1 and 2 are brought into the open state, the spring member 25 biases the slide pin 20 in the direction of moving the slide pin 20 toward the inside portion of the guide hole 22 of the guide plate 23. Accordingly, the mobile phone is capable of performing semiautomatic and smooth opening and closing operations of the cases 1 and 2.

[Sliding Operations of Mobile Phone according to Third Embodiment] Subsequently, description will be made of sliding operations of the mobile phone according to the third embodiment having the configuration as described above.

[Sliding Operation for Bringing Cases into Open State from Closed State] Description will be first made of a sliding operation for bringing the cases 1 and 2 into the open state illustrated in FIG. 17 from the closed state illustrated in FIGS. 15 and 16.

In the closed state of the cases 1 and 2, the slide pin 20 is biased by the spring member 25 in the direction of moving the slide pin 20 toward the outside portion of the guide hole 22. Further, in the closed state of the cases 1 and 2, the slide pin 20 is located in the outside portion of the guide hole 22 of the guide plate 23 illustrated in FIG. 18. The width A1 in the lateral direction of the outside portion of the guide hole 22 is less than the width B1 in the lateral direction of the inside portion of the guide hole 22.

In the closed state of the cases 1 and 2, therefore, the rotation of the slide pin 20 along the circumferential direction of the guide shaft 21 is regulated by the narrow-width portion of the guide hole 22 (i.e., the portion having the width A1) against the biasing force of the spring member 25.

In this state, the first case 1 is applied with force in the opening direction illustrated in FIG. 15, and the second case 2 is applied with force in the closing direction. Then, the forces applied to the cases 1 and 2 are transmitted to the slide pin 20 via the arm member 24. Thereby, the slide pin 20 starts moving along the guide shaft 21 from the outside portion to the inside portion of the guide hole 22 of the guide plate 23. At the same time, the position of the one end portion 25a of the spring member 25 connected to the slide pin 20 also moves from the outside portion to the inside portion of the guide hole 22 in accordance with the movement of the slide pin 20.

Then, the first case 1 is further applied with the force in the opening direction, and the second case 2 is further applied with the force in the closing direction. Thereby, the arm member 24 moves the slide pin 20 to a position slightly inside a substantial center of the guide hole 22 of the guide plate 23. Then, the biasing direction of the spring member 25 biasing the slide pin 20 changes into the direction of moving the slide pin 20 toward the inside portion of the guide hole 22.

That is, the position of the one end portion 25*a* of the spring member 25 connected to the slide pin 20 moves in accordance with the movement of the slide pin 20. Therefore, the biasing direction of the spring member 25 which biases the slide pin 20 in the direction of moving the slide pin 20 toward the outside portion of the guide hole 22 in the closed state of the cases 1 and 2 changes into the direction of moving the slide pin 20 toward the inside portion of the guide hole 22, when the slide pin 20 reaches the position slightly inside the substantial center of the guide hole 22.

When the biasing direction of the spring member 25 changes into the direction of moving the slide pin 20 toward the inside portion of the guide hole 22, the slide pin 20 is biased toward the inside portion of the guide hole 22 due to the biasing force of the spring member 25. Thereby, the slide pin 20 moves until coming into contact with the inside sidewall portion of the guide hole 22.

Accordingly, after the cases 1 and 2 are applied with the above-described forces until being brought into a substantially half open state, the slide pin 20 automatically moves until coming into contact with the inside sidewall portion of the guide hole 22 due to the biasing force of the spring member 25.

Herein, as described above, the spring member 25 constantly biases the slide pin 20 in the direction of opening the cases 1 and 2, as indicated by an arrow in FIG. 15. Further, the width B1 in the lateral direction of the inside portion of the guide hole 22 is greater than the width A1 in the lateral direction of the outside portion of the guide hole 22.

Therefore, when the slide pin 20 moves and comes into contact with the inside sidewall portion of the guide hole 22, the rotation of the slide pin 20 regulated due to the width of the outside portion of the guide hole 22 (i.e., the width A1) is allowed (i.e., the regulation is removed) due to the width of the inside portion of the guide hole 22 (i.e., the width B1) greater than the diameter of the slide pin 20. Then, due to the biasing force of the spring member 25, the slide pin 20 rotates in an inclination direction indicated by an arrow in FIG. 15 (i.e., the opening direction according to the rotation of the cases 1 and 2) along the circumferential direction of the guide shaft 21.

That is, the bottom surface portion 20*a* of the slide pin 20 is provided with the inclined portion 35, which has the inclination corresponding to the inclination of the first case 1 and prevents the slide pin 20 from coming into contact with the second case 2. If the above-described regulation of the slide pin 20 is removed, therefore, the slide pin 20 rotates in the inclination direction indicated by the arrow in FIG. 15 in accordance with the biasing force of the spring member 25, with the bottom surface portion 20*a* not coming into contact with the second case 2.

As the slide pin 20 rotates in the inclination direction, the force of the rotation is transmitted to the first case 1 via the arm member 24.

Further, the area from the vicinity of a substantial center of the first case 1 to the keyboard-side side surface portion 1*d* is processed to be inclined such that the thickness of the non-keyboard-side side surface portion 1*c* of the first case 1 is more than the thickness of the keyboard-side side surface portion 1*d*. Further, the area from the vicinity of a substantial center of the second case 2 to the keyboard-projecting-side side surface portion 2*d* is processed to be inclined such that the thickness of the non-keyboard-projecting-side side surface portion 2*c* of the second case 2 is less than the thickness of the keyboard-projecting-side side surface portion 2*d*.

Therefore, the first case 1 is pushed obliquely upward along the inclined portion 35 of the slide pin 20 via the arm member 24, to which the force of the rotation of the slide pin 20 has been transmitted. Thereby, the first case 1 is obliquely inclined such that the height position of the non-keyboard-side side surface portion 1*c* of the first case 1 is higher than the height position of the keyboard-side side surface portion 1*d* of the first case 1. As a result, the mobile phone is placed in the open state illustrated in FIG. 17.

According to the thus configured mobile phone, in the open state of the cases 1 and 2, the first case 1 is obliquely inclined such that the height position of the non-keyboard-side side surface portion 1*c* of the first case 1 is higher than the height position of the keyboard-side side surface portion 1*d* of the first case 1. Therefore, the angle of inclination of the display surface 1*b* of the first case 1 provided with the display section can be set to be an ergonomically favorable angle of inclination with respect to the operation surface of the keyboard provided to the second case 2. Accordingly, it is possible to ensure favorable visibility of the display section.

Further, in the mobile phone according to the third embodiment, the guide plate 23 is fixedly screwed along the non-keyboard-projecting-side side surface portion 2*c* of the second case 2. In the open state of the cases 1 and 2, therefore, the keyboard-side side surface portion 1*d* of the first case 1 and the non-keyboard-projecting-side side surface portion 2*c* of the second case 2 are substantially close to each other. Therefore, the inclination of the first case 1 in the open state can be set to be more favorable than the inclination of the first case 1 of the mobile phone according to the foregoing first embodiment. Accordingly, it is possible to ensure more favorable visibility of the display section.

Further, in the mobile phone according to the third embodiment, due to the guide plate 23 fixedly screwed along the non-keyboard-projecting-side side surface portion 2*c* of the second case 2, even in the configuration which does not include the mechanism for projecting the keyboard 4, and in which the keyboard provided to the second case 2 is exposed when the first case 1 slidingly moves in the opening direction, it is possible to increase the exposed area of the keyboard provided to the second case 2, which is exposed in the open state of the cases 1 and 2.

Accordingly, it is possible to increase the intervals between keys on the keyboard provided to the second case 2, and thus to facilitate the input operation. Further, it is possible to provide the keyboard with keys physically larger than existing keys, and thus to facilitate the input operation. Alternatively, due to the increased input operation surface of the keyboard, it is possible to provide the keyboard with keys larger in number than existing keys.

[Sliding Operation for Bringing Cases into Closed State from Open State] Subsequently, description will be made of a sliding operation for bringing the cases 1 and 2 into the closed state illustrated in FIGS. 15 and 16 from the open state illustrated in FIG. 17.

As described above, in the open state of the cases 1 and 2, the slide pin 20 is biased by the spring member 25 in the direction of moving the slide pin 20 toward the inside portion of the guide hole 22. In this state, the first case 1 is applied with force in the closing direction illustrated in FIG. 17, and the second case 2 is applied with force in the opening direction. Thereby, the forces applied to the cases 1 and 2 are transmitted to the slide pin 20 via the arm member 24, and the slide pin 20 starts moving along the guide shaft 21 from the inside portion to the outside portion of the guide hole 22 of the guide plate 23. At the same time, the position of the one end portion 25a of the spring member 25 connected to the slide pin 20 also moves from the inside portion to the outside portion of the guide hole 22 in accordance with the movement of the slide pin 20.

Then, the first case 1 is further applied with the force in the closing direction, and the second case 2 is further applied with the force in the opening direction. Thereby, the arm member 24 moves the slide pin 20 to a position slightly outside the substantial center of the guide hole 22 of the guide plate 23. Then, the biasing direction of the spring member 25 biasing the slide pin 20 changes into the direction of moving the slide pin 20 toward the outside portion of the guide hole 22.

That is, the position of the one end portion 25a of the spring member 25 connected to the slide pin 20 moves in accordance with the movement of the slide pin 20. Therefore, the biasing direction of the spring member 25 which biases the slide pin 20 in the direction of moving the slide pin 20 toward the inside portion of the guide hole 22 in the open state of the cases 1 and 2 changes into the direction of moving the slide pin 20 toward the outside portion of the guide hole 22, when the slide pin 20 reaches the position slightly outside the substantial center of the guide hole 22.

When the biasing direction of the spring member 25 changes into the direction of moving the slide pin 20 toward the outside portion of the guide hole 22, the slide pin 20 is biased toward the outside portion of the guide hole 22 due to the biasing force of the spring member 25. Thereby, the slide pin 20 moves until coming into contact with the outside sidewall portion of the guide hole 22.

Accordingly, after the cases 1 and 2 are applied with the above-described forces until being brought into a substantially half closed state, the slide pin 20 automatically moves until coming into contact with the outside sidewall portion of the guide hole 22 due to the biasing force of the spring member 25.

Herein, when the cases 1 and 2 are brought into the closed state from the open state, the first case 1 obliquely standing with respect to the second case 2 is brought back to the state in which the first case 1 is superimposed on the second case 2 to be parallel to the second case 2. Therefore, the force with which the first case 1 is superimposed on the second case 2 to be parallel to the second case 2 corresponds to the force for pushing the first case 1 in the thickness direction of the second case 2. The force for pushing the first case 1 in the thickness direction of the second case 2 is transmitted to the slide pin 20 via the arm member 24. Further, as illustrated in FIG. 18, the width A1 in the lateral direction of the outside portion of the guide hole 22 of the guide plate 23 is less than the width B1 in the lateral direction of the inside portion of the guide hole 22.

Therefore, as the slide pin 20 moves from the inside sidewall portion to the outside sidewall portion of the guide hole 22, the width of the guide hole 22 is reduced. Further, applied with the force for pushing the first case 1 in the thickness direction of the second case 2, the slide pin 20 rotates in an anti-inclination direction illustrated in FIG. 15 (i.e., the closing direction according to the rotation of the cases 1 and 2) along the outer circumference of the guide shaft 21.

Accordingly, the slide pin 20, the regulation of which has been removed due to the width of the inside portion of the guide hole 22, returns to the state in which the rotation is regulated due to the width of the outside portion of the guide hole 22. As a result, the cases 1 and 2 are placed in the closed state, as illustrated in FIGS. 15 and 16.

The cases 1 and 2 are processed to be inclined as described above such that the thickness combining the thickness of the non-keyboard-side side surface portion 1c of the first case 1 and the thickness of the non-keyboard-projecting-side side surface portion 2c of the second case 2 is substantially the same as the thickness combining the thickness of the keyboard-side side surface portion 1d of the first case 1 and the thickness of the keyboard-projecting-side side surface portion 2d of the second case 2. In the closed state, therefore, the mobile phone as a whole maintains a substantially rectangular parallelepiped shape, even though the cases 1 and 2 are processed to be inclined as described above.

Effects of Third Embodiment

As obvious from the above description, in the mobile phone according to the third embodiment, the slide holding mechanism of the cases 1 and 2 includes the single slide pin 20 and the guide shaft 21. The slide pin 20 has a substantially cylindrical shape, and includes the guide shaft insertion holes 26 piercing through the one side surface portion and the other side surface portion thereof. The guide shaft 21 is inserted in the guide shaft insertion holes 26 of the slide pin 20 to hold the slide pin 20 to be movable along the longitudinal direction of the guide shaft 21 and rotatable along the circumferential direction of the guide shaft 21.

The slide holding mechanism further includes the single spring member 25 and the single arm member 24. The spring member 25 has the one end portion connected to the slide pin 20 and the other end portion connected to the second case 2 to bias the slide pin 20 in the direction of opening the cases 1 and 2, to thereby rotate the slide pin 20 along the circumferential direction of the guide shaft 21. The arm member 24 has the one end portion connected to the slide pin 20 and the other end portion connected to the first case 1 to hold the slide pin 20 to be movable along the longitudinal direction of the guide shaft 21 and rotatable along the circumferential direction of the guide shaft 21.

The slide holding mechanism further includes the guide plate 23 including the single guide hole 22. The guide plate 23 is provided to the second case 2, with the slide pin 20 inserted in the guide plate 23. In the closed state of the cases 1 and 2, the guide hole 22 regulates the rotation of the slide pin 20 in the inclination direction along the circumferential direction of the guide shaft 21, against the biasing force of the spring member 25. When the cases 1 and 2 are brought into the open state, the guide hole 22 removes the regulation and allows the slide pin 20 to rotate in the inclination direction along the circumferential direction of the guide shaft 21 in accordance with the biasing force of the spring member 25, to thereby allow the first case 1 to incline with respect to the second case 2.

In the operation of bringing the cases 1 and 2 into the open state illustrated in FIG. 17, therefore, it is possible to semi-automatically and smoothly bring the cases 1 and 2 into the open state.

Further, in the open state of the cases 1 and 2, the first case 1 is obliquely inclined such that the height position of the non-keyboard-side side surface portion 1c of the first case 1 is higher than the height position of the keyboard-side side surface portion 1d of the first case 1. Therefore, the angle of inclination of the display surface 1b of the first case 1 provided with the display section can be set to be an ergonomically favorable angle of inclination with respect to the operation surface of the keyboard provided to the second case 2. Accordingly, it is possible to ensure favorable visibility of the display section.

Further, the guide plate 23 is fixedly screwed along the non-keyboard-projecting-side side surface portion 2c of the second case 2. In the open state of the cases 1 and 2, therefore, the keyboard-side side surface portion 1d of the first case 1 and the non-keyboard-projecting-side side surface portion 2c of the second case 2 are substantially close to each other. Therefore, the inclination of the first case 1 in the open state can be set to be more favorable than the inclination of the first case 1 of the mobile phone according to the foregoing first embodiment. Accordingly, it is possible to ensure more favorable visibility of the display section.

Further, due to the guide plate 23 fixedly screwed along the non-keyboard-projecting-side side surface portion 2c of the second case 2, even in the configuration which does not include the mechanism for projecting the keyboard 4, and in which the keyboard provided to the second case 2 is exposed when the first case 1 slidingly moves in the opening direction, it is possible to increase the exposed area of the keyboard provided to the second case 2, which is exposed in the open state of the cases 1 and 2.

Accordingly, it is possible to increase the intervals between the keys on the keyboard provided to the second case 2, and thus to facilitate the input operation. Further, it is possible to provide the keyboard with keys physically larger than existing keys, and thus to facilitate the input operation. Alternatively, due to the increased input operation surface of the keyboard, it is possible to provide the keyboard with keys larger in number than existing keys.

Further, the mobile phone according to the foregoing second embodiment includes the pair of slide pins 20, the pair of arm members 24, the pair of spring members 25, and so forth. Meanwhile, the mobile phone according to the third embodiment includes the single slide pin 20, the single arm member 24, the single spring member 25, and so forth. Therefore, the number of components can be reduced in the mobile phone according to the third embodiment, as compared with in the mobile phone according to the foregoing second embodiment. Accordingly, it is possible to manufacture the mobile phone with a simplified structure at low cost.

MODIFIED EXAMPLES

In the description of the above embodiments, the present invention is applied to the mobile phone. The present invention may also be applied to other mobile devices, such as a PHS (Personal Handyphone System) phone, a PDA (Personal Digital. Assistant) device, a portable game machine, and a digital camera device. In any case, effects similar to the above-described effects can be obtained.

The present application contains subject matter related to that disclosed in Japanese Priority Patent Applications JP 2009-100955 filed in the Japan Patent Office on Apr. 17, 2009, and JP 2010-005342 filed in the Japan Patent Office on Jan. 13, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal device comprising:
a first case configured to include a display section;
a second case configured to include a keyboard; and
a slide holding mechanism configured to, in accordance with sliding movement of the first case with respect to the second case in the opening direction from a closed state in which the first case is substantially fully superimposed on the second case, expose at least a part of the keyboard of the second case and bring the cases into an open state in which the first case is inclined with respect to the second case,
wherein the slide holding mechanism includes
a slide pin having a substantially cylindrical shape and configured to include guide shaft insertion holes piercing through one side surface portion and the other side surface portion thereof,
a guide shaft inserted in the guide shaft insertion holes of the slide pin to hold the slide pin to be movable along the longitudinal direction of the guide shaft and rotatable along the circumferential direction of the guide shaft,
a biasing member having one end portion connected to the slide pin and the other end portion connected to the second case to bias the slide pin in the opening direction, to thereby rotate the slide pin along the circumferential direction of the guide shaft,
an arm member having one end portion connected to the slide pin and the other end portion connected to the first case to hold the slide pin to be movable along the longitudinal direction of the guide shaft and rotatable along the circumferential direction of the guide shaft, and
a guide plate provided to the second case with the slide pin inserted therein, and configured to include a guide hole which, in the closed state of the cases, regulates the rotation of the slide pin along the circumferential direction of the guide shaft, and which, when the cases are brought into the open state, removes the regulation and allows the slide pin to rotate along the circumferential direction of the guide shaft, to thereby allow the first case to incline with respect to the second case in accordance with the rotation.

2. The mobile terminal device according to claim 1, wherein, to allow the first case to incline with respect to the second case in the open state of the cases, a portion of the slide pin coming into contact with the second case is processed to have an inclination corresponding to the inclination of the first case and preventing the slide pin from coming into contact with the second case.

3. The mobile terminal device according to claim 2, wherein the guide hole of the guide plate is processed to have a width which gradually increases from an end portion of the guide hole in contact with the slide pin in the closed state of the cases toward an end portion of the guide hole in contact with the slide pin in the open state of the cases.

4. The mobile terminal device according to claim 2, wherein the first case is processed to be inclined in the area from the vicinity of a substantial center of the first case to a keyboard-side side surface portion of the first case such that the thickness of a non-keyboard-side side surface portion of the first case is more than the thickness of the keyboard-side side surface portion,
wherein the second case is processed to be inclined in the area from the vicinity of a substantial center of the second case to a keyboard-projecting-side side surface portion of the second case such that the thickness of a non-keyboard-projecting-side side surface portion of the second case is less than the thickness of the keyboard-projecting-side side surface portion, wherein the non-keyboard-projecting-side side surface portion is opposite to the keyboard-projecting-side side surface portion, from which the keyboard projects, and wherein, in the closed state of the cases, the thickness combining the thickness of the non-keyboard-side side surface portion of the first case and the thickness of the non-keyboard-projecting-side side surface portion of the second case is substantially the same as the thickness combining the thickness of the keyboard-side side surface portion of the first case and the thickness of the keyboard-projecting-side side surface portion of the second case.

5. The mobile terminal device according to claim 2, wherein the keyboard is stored in the second case and provided to be movable along sliding directions of the cases, wherein the mobile terminal device further comprises:

a first biasing member configured to bias the keyboard in a projecting direction opposite to the direction in which the first case moves when the cases are brought into the open state;

a hook portion provided to a storing-side end portion of the keyboard opposite to a projecting-side end portion of the keyboard corresponding to an end portion of the keyboard in the projecting direction;

a keyboard locking member configured to include a projecting portion which projects from a sliding contact surface of the second case slidingly contacting with the first case and an engaging portion which engages with the hook portion, and provided to the second case to be movable only in directions perpendicular to the sliding directions of the second case, with the projecting portion projecting from the sliding contact surface of the second case;

a second biasing member configured to bias the keyboard locking member in a direction of making the engaging portion engaged with the hook portion; and a slide groove portion provided to the first case along the sliding directions of the first case to allow the projecting portion of the keyboard locking member to slidingly move therein, and configured to include a locking groove portion which allows, when the cases are brought into the closed state, the keyboard locking member to move via the projecting portion in the direction of making the engaging portion of the keyboard locking member engaged with the hook portion and an unlocking groove portion which is provided to communicate with the locking groove portion and allows, when the cases are brought into the open state, the keyboard locking member to move via the projecting portion in a direction of making the engaging portion of the keyboard locking member disengaged from the hook portion, wherein, in the closed state of the cases, the engaging portion of the keyboard locking member is engaged with the hook portion to hold the keyboard stored in the second case, and wherein, in the open state of the cases, the engaging portion of the keyboard locking member is disengaged from the hook portion to allow the first biasing member to bias the keyboard in the projecting direction such that the keyboard projects from the second case.

6. The mobile terminal device according to claim 1, wherein the guide hole of the guide plate is processed to have a width which gradually increases from an end portion of the guide hole in contact with the slide pin in the closed state of the cases toward an end portion of the guide hole in contact with the slide pin in the open state of the cases.

7. The mobile terminal device according to claim 6, wherein the first case is processed to be inclined in the area from the vicinity of a substantial center of the first case to a keyboard-side side surface portion of the first case such that the thickness of a non-keyboard-side side surface portion of the first case is more than the thickness of the keyboard-side side surface portion, wherein the second case is processed to be inclined in the area from the vicinity of a substantial center of the second case to a keyboard-projecting-side side surface portion of the second case such that the thickness of a non-keyboard-projecting-side side surface portion of the second case is less than the thickness of the keyboard-projecting-side side surface portion, wherein the non-keyboard-projecting-side side surface portion is opposite to the keyboard-projecting-side side surface portion, from which the keyboard projects, and wherein, in the closed state of the cases, the thickness combining the thickness of the non-keyboard-side side surface portion of the first case and the thickness of the non-keyboard-projecting-side side surface portion of the second case is substantially the same as the thickness combining the thickness of the keyboard-side side surface portion of the first case and the thickness of the keyboard-projecting-side side surface portion of the second case.

8. The mobile terminal device according to claim 6, wherein the keyboard is stored in the second case and provided to be movable along sliding directions of the cases, wherein the mobile terminal device further comprises:

a first biasing member configured to bias the keyboard in a projecting direction opposite to the direction in which the first case moves when the cases are brought into the open state;

a hook portion provided to a storing-side end portion of the keyboard opposite to a projecting-side end portion of the keyboard corresponding to an end portion of the keyboard in the projecting direction;

a keyboard locking member configured to include a projecting portion which projects from a sliding contact surface of the second case slidingly contacting with the first case and an engaging portion which engages with the hook portion, and provided to the second case to be movable only in directions perpendicular to the sliding directions of the second case, with the projecting portion projecting from the sliding contact surface of the second case;

a second biasing member configured to bias the keyboard locking member in a direction of making the engaging portion engaged with the hook portion; and a slide groove portion provided to the first case along the sliding directions of the first case to allow the projecting portion of the keyboard locking member to slidingly move therein, and configured to include a locking groove portion which allows, when the cases are brought into the closed state, the keyboard locking member to move via the projecting portion in the direction of making the engaging portion of the keyboard locking member engaged with the hook portion and an unlocking groove portion which is provided to communicate with the locking groove portion and allows, when the cases are brought into the open state, the keyboard locking member to move via the projecting portion in a direction of making the engaging portion of the keyboard locking member disengaged from the hook portion, wherein, in the closed state of the cases, the engaging portion of the keyboard locking member is engaged with the hook portion to hold the keyboard stored in the second case, and wherein, in the open state of the cases, the engaging portion of the keyboard locking member is disengaged from the hook portion to allow the first biasing member to bias the keyboard in the projecting direction such that the keyboard projects from the second case.

9. The mobile terminal device according to claim 1,
wherein the first case is processed to be inclined in the area from the vicinity of a substantial center of the first case to a keyboard-side side surface portion of the first case such that the thickness of a non-keyboard-side side surface portion of the first case is more than the thickness of the keyboard-side side surface portion, wherein the second case is processed to be inclined in the area from the vicinity of a substantial center of the second case to a keyboard-projecting-side side surface portion of the second case such that the thickness of a non-keyboard-projecting-side side surface portion of the second case is less than the thickness of the keyboard-projecting-side side surface portion, wherein the non-keyboard-projecting-side side surface portion is opposite to the keyboard-projecting-side side surface portion, from which the keyboard projects, and wherein, in the closed state of the cases, the thickness combining the thickness of the non-keyboard-side side surface portion of the first case and the thickness of the non-keyboard-projecting-side side surface portion of the second case is substantially the same as the thickness combining the thickness of the keyboard-side side surface portion of the first case and the thickness of the keyboard-projecting-side side surface portion of the second case.

10. The mobile terminal device according to claim 9,
wherein the keyboard is stored in the second case and provided to be movable along sliding directions of the cases, wherein the mobile terminal device further comprises:
 a first biasing member configured to bias the keyboard in a projecting direction opposite to the direction in which the first case moves when the cases are brought into the open state;
 a hook portion provided to a storing-side end portion of the keyboard opposite to a projecting-side end portion of the keyboard corresponding to an end portion of the keyboard in the projecting direction;
 a keyboard locking member configured to include a projecting portion which projects from a sliding contact surface of the second case slidingly contacting with the first case and an engaging portion which engages with the hook portion, and provided to the second case to be movable only in directions perpendicular to the sliding directions of the second case, with the projecting portion projecting from the sliding contact surface of the second case;
 a second biasing member configured to bias the keyboard locking member in a direction of making the engaging portion engaged with the hook portion; and
 a slide groove portion provided to the first case along the sliding directions of the first case to allow the projecting portion of the keyboard locking member to slidingly move therein, and configured to include a locking groove portion which allows, when the cases are brought into the closed state, the keyboard locking member to move via the projecting portion in the direction of making the engaging portion of the keyboard locking member engaged with the hook portion and an unlocking groove portion which is provided to communicate with the locking groove portion and allows, when the cases are brought into the open state, the keyboard locking member to move via the projecting portion in a direction of making the engaging portion of the keyboard locking member disengaged from the hook portion, wherein, in the closed state of the cases, the engaging portion of the keyboard locking member is engaged with the hook portion to hold the keyboard stored in the second case, and wherein, in the open state of the cases, the engaging portion of the keyboard locking member is disengaged from the hook portion to allow the first biasing member to bias the keyboard in the projecting direction such that the keyboard projects from the second case.

11. The mobile terminal device according to claim 1,
wherein the keyboard is stored in the second case and provided to be movable along sliding directions of the cases, wherein the mobile terminal device further comprises:
 a first biasing member configured to bias the keyboard in a projecting direction opposite to the direction in which the first case moves when the cases are brought into the open state;
 a hook portion provided to a storing-side end portion of the keyboard opposite to a projecting-side end portion of the keyboard corresponding to an end portion of the keyboard in the projecting direction;
 a keyboard locking member configured to include a projecting portion which projects from a sliding contact surface of the second case slidingly contacting with the first case and an engaging portion which engages with the hook portion, and provided to the second case to be movable only in directions perpendicular to the sliding directions of the second case, with the projecting portion projecting from the sliding contact surface of the second case;
 a second biasing member configured to bias the keyboard locking member in a direction of making the engaging portion engaged with the hook portion; and
 a slide groove portion provided to the first case along the sliding directions of the first case to allow the projecting portion of the keyboard locking member to slidingly move therein, and configured to include a locking groove portion which allows, when the cases are brought into the closed state, the keyboard locking member to move via the projecting portion in the direction of making the engaging portion of the keyboard locking member engaged with the hook portion and an unlocking groove portion which is provided to communicate with the locking groove portion and allows, when the cases are brought into the open state, the keyboard locking member to move via the projecting portion in a direction of making the engaging portion of the keyboard locking member disengaged from the hook portion, wherein, in the closed state of the cases, the engaging portion of the keyboard locking member is engaged with the hook portion to hold the keyboard stored in the second case, and wherein, in the open state of the cases, the engaging portion of the keyboard locking member is disengaged from the hook portion to allow the first biasing member to bias the keyboard in the projecting direction such that the keyboard projects from the second case.

12. The mobile terminal device according to claim 11, wherein the hook portion provided to the storing-side end portion of the keyboard is provided at least in a pair, with a predetermined interval provided between the hook portions, and wherein the keyboard locking member provided to the second case is provided at least in a pair at respective positions corresponding to the hook portions.

* * * * *